US010310675B2

(12) United States Patent
Oshima

(10) Patent No.: US 10,310,675 B2
(45) Date of Patent: Jun. 4, 2019

(54) USER INTERFACE APPARATUS AND CONTROL METHOD

(71) Applicant: CANON KABUSHIKI KAISHA, Tokyo (JP)

(72) Inventor: Soshi Oshima, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 58 days.

(21) Appl. No.: 14/818,770

(22) Filed: Aug. 5, 2015

(65) Prior Publication Data
US 2016/0054859 A1    Feb. 25, 2016

(30) Foreign Application Priority Data

Aug. 25, 2014 (JP) ................. 2014-170886
Jan. 22, 2015 (JP) ................. 2015-010680
Jul. 24, 2015 (JP) ................. 2015-147083

(51) Int. Cl.
*G06F 3/01* (2006.01)
*G06F 3/042* (2006.01)
(Continued)

(52) U.S. Cl.
CPC ............ *G06F 3/0425* (2013.01); *G06F 3/017* (2013.01); *G06F 3/0304* (2013.01);
(Continued)

(58) Field of Classification Search
CPC ......... G06F 2203/013; G06F 2203/014; G06F 2203/015; G06F 3/011; G06F 3/012;
(Continued)

(56) References Cited

U.S. PATENT DOCUMENTS 6,147,678 A * 11/2000 Kumar ............... G06F 3/017
    345/156
6,204,852 B1 * 3/2001 Kumar ............... G06F 3/017
    345/419
(Continued)

FOREIGN PATENT DOCUMENTS

JP    2009-042796 A    2/2009
JP    2010-526391 A    7/2010
(Continued)

OTHER PUBLICATIONS

Taehee Lee and Tobias Hollerer, "Handy AR: Markerless Inspection of Augmented Reality Objects Using Fingertip Tracking", Proc. IEEE International Symposium on Wearable Computers (ISWC), Oct. 2007, pp. 1-8, Boston, MA.

*Primary Examiner* — Grant Sitta
(74) *Attorney, Agent, or Firm* — Venable LLP

(57) ABSTRACT

A three-dimensional image of an operation surface and a region upward thereof is acquired, a hand region is extracted from the three-dimensional image, and the position of a fingertip is specified based on the extracted hand region. A touch on the operation surface is detected based on the operation surface included in the three-dimensional image and the specified position of the fingertip, and if a touch is detected, the direction of the fingertip is specified, and a position obtained by shifting the position of the fingertip by a predetermined amount in the direction opposite to the specified direction of the fingertip is determined as the touch position.

22 Claims, 17 Drawing Sheets

(51) Int. Cl.
  *G06K 9/00*    (2006.01)
  *G06F 3/03*    (2006.01)
  *G06F 3/0488*  (2013.01)

(52) U.S. Cl.
  CPC ........ *G06F 3/0426* (2013.01); *G06F 3/04883* (2013.01); *G06K 9/00389* (2013.01); *G06F 2203/04101* (2013.01)

(58) Field of Classification Search
  CPC .......... G06F 3/013; G06F 3/014; G06F 3/016; G06F 3/0416; G06F 3/0418; G06F 345/156; G06F 2203/041; G06F 3/03547; G06F 3/0412; G06F 3/0414; G06F 3/046
  USPC .................................................. 345/156–175
  See application file for complete search history.

(56) References Cited

U.S. PATENT DOCUMENTS

| | | | | |
|---|---|---|---|---|
| 7,001,024 | B2* | 2/2006 | Kitaguchi | G03B 21/26 348/135 |
| 8,395,600 | B2 | 3/2013 | Kawashima et al. | |
| 3,472,665 | A1 | 6/2013 | Hildreth | |
| 9,092,090 | B2* | 7/2015 | Zhang | G06F 3/042 |
| 9,665,168 | B2* | 5/2017 | Oshima | H04N 13/363 |
| 10,049,264 | B2* | 8/2018 | Iwayama | G06K 9/00355 |
| 10,186,057 | B2 | 1/2019 | Shimura et al. | |
| 2007/0262965 | A1* | 11/2007 | Hirai | B60R 11/0235 345/173 |
| 2008/0005703 | A1* | 1/2008 | Radivojevic | G06F 1/1626 715/863 |
| 2008/0068343 | A1* | 3/2008 | Hoshino | G06F 3/016 345/173 |
| 2008/0273755 | A1* | 11/2008 | Hildreth | G06F 1/1626 382/103 |
| 2010/0194713 | A1* | 8/2010 | Kawashima | G06F 3/042 345/175 |
| 2010/0231522 | A1* | 9/2010 | Li | G06F 3/0423 345/169 |
| 2011/0004821 | A1* | 1/2011 | Miyazawa | G06F 3/04883 715/702 |
| 2011/0025823 | A1* | 2/2011 | Sasaki | G01B 11/24 348/46 |
| 2012/0229377 | A1* | 9/2012 | Kim | G06F 3/017 345/157 |
| 2013/0033484 | A1 | 2/2013 | Liao et al. | |
| 2013/0038540 | A1* | 2/2013 | Anderson | G06F 3/0488 345/173 |
| 2013/0278504 | A1* | 10/2013 | Tong | G06K 9/00355 345/158 |
| 2014/0184558 | A1* | 7/2014 | Midholt | G06F 3/041 345/174 |
| 2014/0204120 | A1* | 7/2014 | Moteki | G06F 3/0416 345/633 |
| 2014/0225826 | A1* | 8/2014 | Juni | G06F 3/0425 345/156 |
| 2015/0049063 | A1* | 2/2015 | Smith | G06F 3/0421 345/175 |
| 2015/0063661 | A1* | 3/2015 | Lee | G06F 3/011 382/124 |
| 2015/0302617 | A1 | 10/2015 | Shimura et al. | |
| 2015/0324084 | A1* | 11/2015 | Chen | G06F 3/0488 345/173 |
| 2015/0370472 | A1* | 12/2015 | Privault | G06F 3/04883 715/769 |
| 2016/0085379 | A1* | 3/2016 | Cho | G06F 3/0426 345/169 |
| 2016/0231862 | A1* | 8/2016 | Tretter | G06F 3/0416 |
| 2016/0378251 | A1* | 12/2016 | Aznoe | G06F 3/04812 345/158 |
| 2017/0147142 | A1* | 5/2017 | Gu | G06F 3/0488 |

FOREIGN PATENT DOCUMENTS

| | | |
|---|---|---|
| JP | 2010-176565 A | 8/2010 |
| JP | 2013034168 A | 2/2013 |
| WO | 2014/080829 A1 | 5/2014 |

* cited by examiner

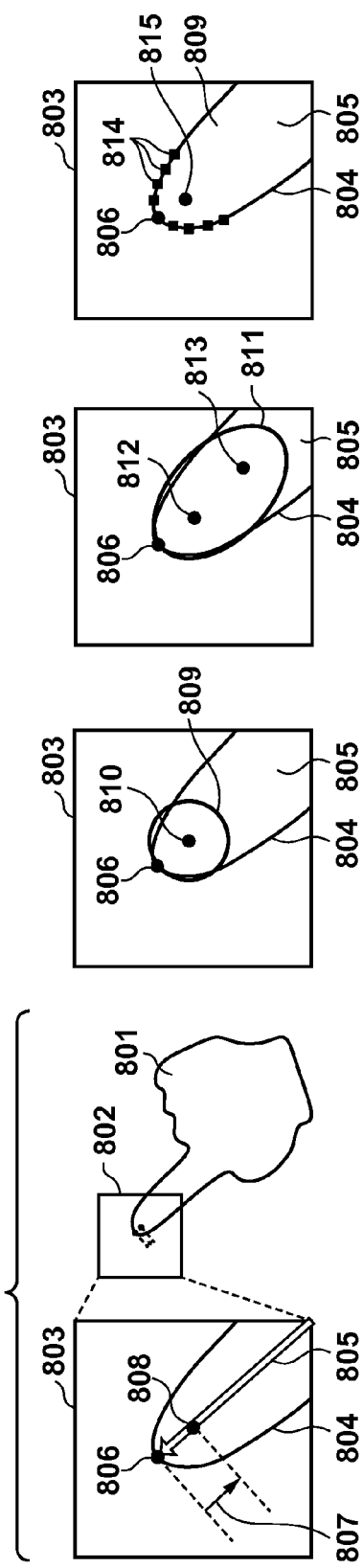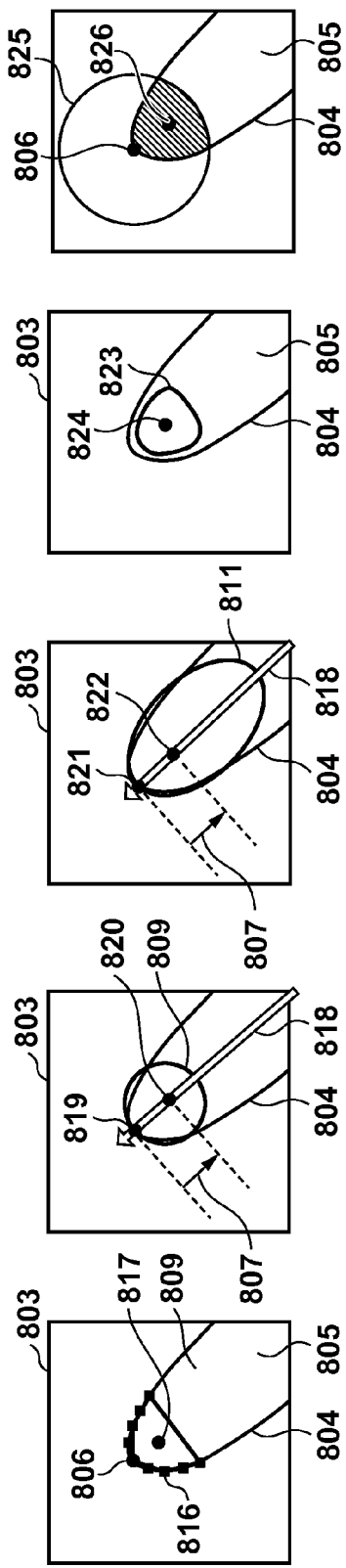

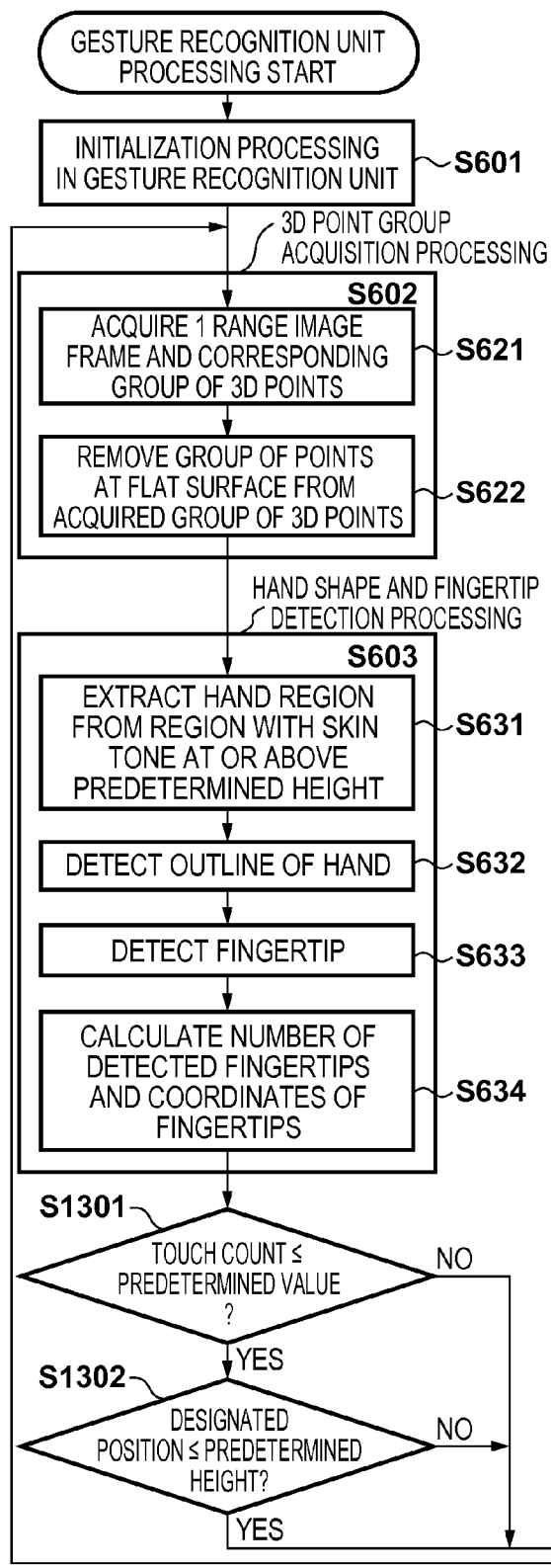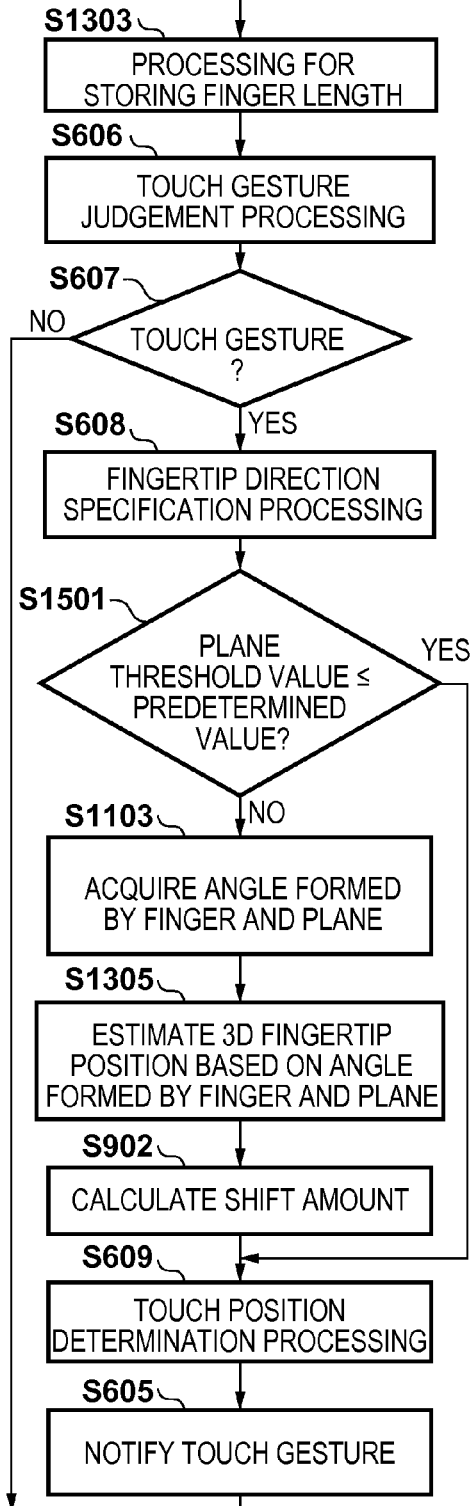
FIG. 15

USER INTERFACE APPARATUS AND CONTROL METHOD

BACKGROUND OF THE INVENTION

Field of the Invention

The present invention relates to a user interface apparatus and a control method for remotely detecting the position of a hand, a fingertip, or the like, and performing an operation on a display component displayed on a specific surface.

Description of the Related Art

In a user interface employing a projector, a camera, and a range sensor, projecting the user interface using the projector makes it possible to display the user interface superimposed on an actual object such as a sheet of paper. The user can thus handle the actual object as an interface with electronic data. With the user interface system disclosed in Japanese Patent Laid-Open No. 2013-34168, a computer screen is projected onto a table by a projector, and the computer screen is operated with a fingertip. An infrared camera is used to detect a touch on a flat surface by the fingertip. In Japanese Patent Laid-Open No. 2013-34168, an object such as a table or a sheet of paper is used as the user interface, and touch instructions are given using a finger or a pen. Here, when using a finger to perform an operation of selecting characters approximately 5 square mm in size or drawing a line underneath characters, an accurate touch position needs to be determined.

However, in Japanese Patent Laid-Open No. 2013-34168, when performing touch detection with a finger and a flat surface, consideration is not given to the angle formed by the finger and the flat surface. If the angle of the fingertip is not taken into consideration, there is a problem that it is not possible to correctly acquire the positions of the flat surface and the fingertip, and the position of contact between the finger and the operation surface is not accurately recognized. In this case, it is difficult to perform operations such as selecting small characters and drawing a line underneath characters as previously mentioned.

SUMMARY OF THE INVENTION

The present invention provides a user interface apparatus and a control method that can improve precision in contact position detection and improve user operability in technology for performing touch detection through image analysis.

One aspect of the present invention has the following configuration. According to one aspect of the present invention, there is provided a user interface apparatus for specifying an operation performed on an operation surface, comprising: an acquisition unit that acquires a three-dimensional image of a region of the operation surface and a three-dimensional space whose bottom surface is the operation surface; an extraction unit that extracts a hand region from the three-dimensional image; a first specification unit that specifies a position of a fingertip based on the hand region; a detection unit that detects a touch on the operation surface based on the operation surface included in the three-dimensional image and the position of the fingertip; a second specification unit that, in a case where a touch on the operation surface was detected, specifies a direction of the fingertip based on the hand region; and a determination unit that determines, as a touch position, a position obtained by shifting the position of the fingertip by a predetermined amount on the operation surface in a direction opposite to the direction of the fingertip.

Another aspect has the following configuration. According to another aspect of the present invention, there is provided a user interface apparatus for specifying an operation performed on an operation surface, comprising: an acquisition unit that acquires a three-dimensional image of a region of a three-dimensional space whose bottom surface is the operation surface; and an estimation unit that that estimates a position of a finger pad based on the three-dimensional image.

According to the present invention, it is possible to improve precision in contact position detection and improve user operability when detecting touching of an operation surface based on images.

Further features of the present invention will become apparent from the following description of exemplary embodiments with reference to the attached drawings.

BRIEF DESCRIPTION OF THE DRAWINGS

FIGS. 8A to 8I are diagrams schematically showing a method for estimating a touch position based on a fingertip position according to the first embodiment.

FIG. 15 is a flowchart of processing executed by the gesture recognition unit 409 according to the fourth embodiment.

DESCRIPTION OF THE EMBODIMENTS

Embodiments for carrying out the present invention will be described below with reference to the drawings.

First Embodiment

Figure 1:
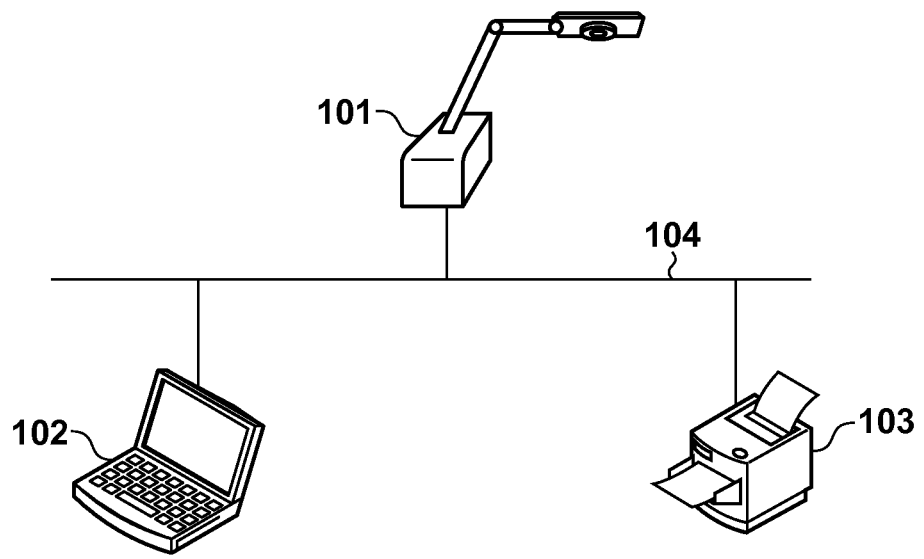
FIG. 1 is a diagram showing an example of a network configuration of a camera scanner 101.

FIG. 1 is a diagram showing the configuration of a network in which a camera scanner 101 according to the first embodiment is included. As shown in FIG. 1, the camera scanner 101 is connected to a host computer 102 and a printer 103 via a network 104 such as an Ethernet (registered trademark) network. In the network configuration shown in FIG. 1, a scan function for scanning an image using the camera scanner 101 and a print function for outputting scanned data using the printer 103 can be executed in accordance with instructions from the host computer 102. Also, the scan function and the print function can also be executed in accordance with an instruction given directly to the camera scanner 101, not via the host computer 102.

Configuration of Camera Scanner

Figure 2A:
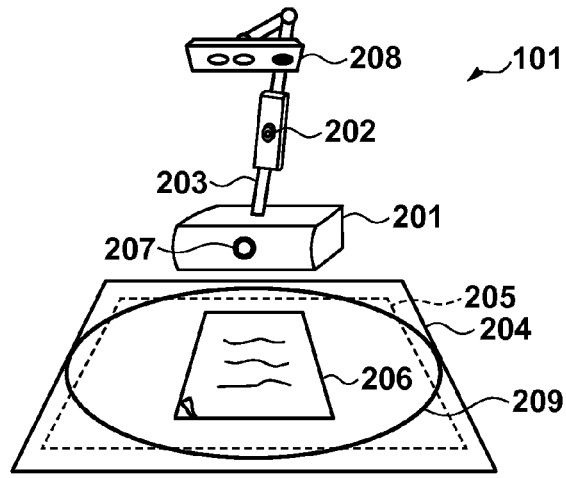
FIG. 2A is a diagram showing an example of an exterior view of the camera scanner 101.
Figure 2B:
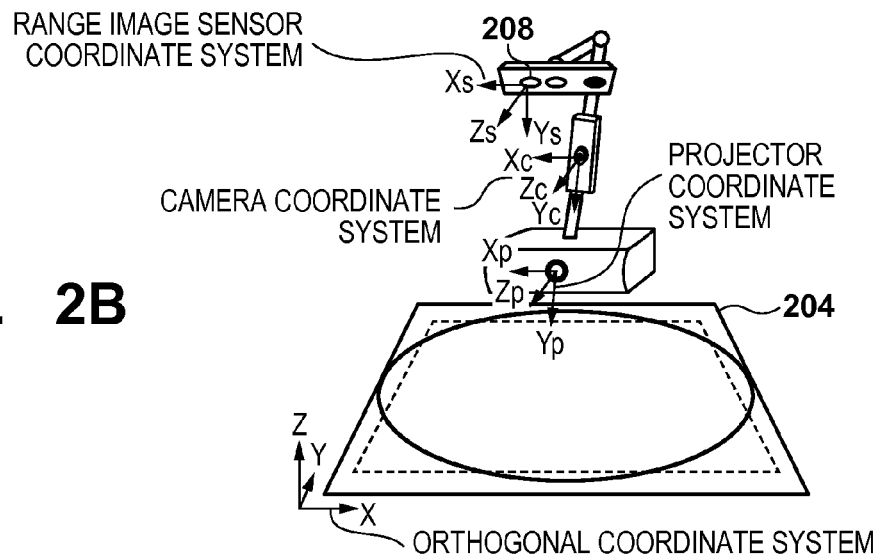
FIGS. 2B and 2C are diagrams illustrating coordinate systems of the camera scanner 101.
Figure 2C:
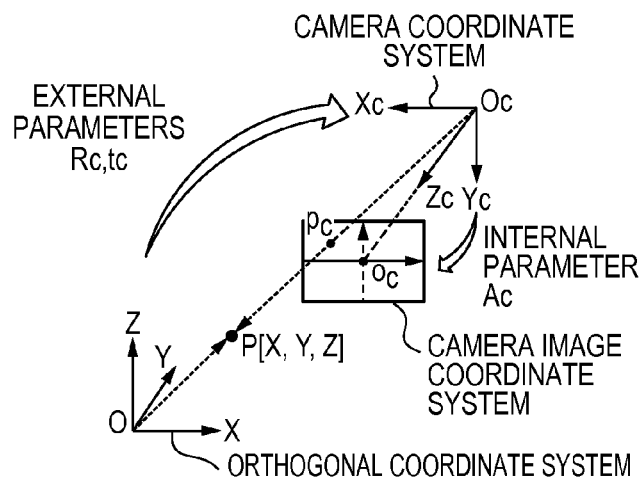

FIGS. 2A to 2C are diagrams showing an example of the configuration of the camera scanner 101 of the first embodiment. As shown in FIG. 2A, the camera scanner 101 includes a controller unit 201, a camera unit 202, an arm unit 203, a projector 207, and a range image sensor unit 208. The controller unit 201, which is the main body of the camera scanner, the camera unit 202 for capturing images, the projector 207, and the range image sensor unit 208 are connected by the arm unit 203. The arm unit 203 can bend and extend using joints. FIG. 2A also shows a document stand 204 on which the camera scanner 101 is installed. The lenses of the camera unit 202 and the range image sensor unit 208 are arranged facing the document stand 204, and an image in a scanning region 205 enclosed in dashed lines can be scanned. In the example shown in FIG. 2A, an original 206 is placed inside the scanning region 205, and therefore can be scanned by the camera scanner 101. The camera unit 202 may capture images in a single resolution, but it is preferable to be able to perform high-resolution image capturing and low-resolution image capturing. A turntable 209 may be provided in the document stand 204. The turntable 209 can rotate in accordance with an instruction from the controller unit 201, and can change the angle between the camera unit 202 and an object placed on the turntable 209. Also, although not shown in FIGS. 2A to 2C, the camera scanner 101 can further include an LCD touch panel 330 and a speaker 340. It can also further include various types of sensor devices such as a human sensor, an illumination sensor, and an acceleration sensor for collecting surrounding environment information. A range image is image data in which a distance from the range image sensor unit 208 is associated with each pixel in the image data.

FIG. 2B shows coordinate systems in the camera scanner 101. Coordinate systems are defined for various hardware devices in the camera scanner 101, namely a camera coordinate system, a range image coordinate system, and a projector coordinate system. These coordinate systems are defined with the image planes of images captured by the camera unit 202 and the range image sensor unit 208 and the image plane of images projected by the projector 207 respectively serving as the XY planes, and the direction orthogonal to these image planes serving as the Z direction.

Furthermore, in order for the three-dimensional image data (three-dimensional data) of these independent coordinate systems to be able to be handled in a unified manner, an orthogonal coordinate system is defined with the plane including the document stand 204 serving as the XY plane, and the direction perpendicularly upward from the XY plane serving as the Z axis. The XY plane is referred to as a bottom surface.

As one example of a case of transformation between coordinate systems, FIG. 2C shows the relationship between the orthogonal coordinate system, a space centered about the camera unit 202 and expressed using the camera coordinate system, and the image plane of an image captured by the camera unit 202. A three-dimensional point P[X,Y,Z] in the orthogonal coordinate system can be transformed into a three-dimensional point Pc[Xc,Yc,Zc] in the camera coordinate system using Expression 1.

$$[X_c, Y_c, Z_c]^T = [R_c | t_c][X, Y, Z, 1]^T \quad (1)$$

Here, Rc and tc represent external parameters obtained using the orientation (rotation) and the position (translation) of the camera relative to the orthogonal coordinate system, and Rc and tc are respectively called a 3×3 rotation matrix and a translation vector. Conversely, a three-dimensional point defined in the camera coordinate system can be transformed to the orthogonal coordinate system using Expression 2.

$$[X, Y, Z]^T = [R_c^{-1} | -R_c^{-1} t_c][X_c, Y_c, Z_c, 1]^T \quad (2)$$

Furthermore, the two-dimensional camera image plane of images captured by the camera unit 202 is obtained by the camera unit 202 transforming three-dimensional information in a three-dimensional space into two-dimensional information. Specifically, a three-dimensional point Pc[Xc, Yc,Zc] in the camera coordinate system can be subjected to perspective projection transformation to obtain a two-dimensional coordinate pc[xp,yp] in the camera image plane using Expression 3.

$$\lambda[x_p, y_p, 1]^T = A[X_c, Y_c, Z_c]^T \quad (3)$$

Here, A is called a camera internal parameter, and represents a 3×3 matrix expressed by the focal length, the image center, and the like.

As described above, by using Expressions 1 to 3, a group of three-dimensional points expressed in the orthogonal coordinate system can be transformed into the camera image plane and a group of three-dimensional point coordinates in the camera coordinate system. Note that the internal parameters of the hardware devices and the position and orientation relative to the orthogonal coordinate system (external parameters) are assumed to have been calibrated in advance using a known calibration technique. Hereinafter, unless otherwise stated in particular, the term "group of three-dimensional points" refers to three-dimensional data in the orthogonal coordinate system.

Hardware Configuration of Controller of Camera Scanner

Figure 3:
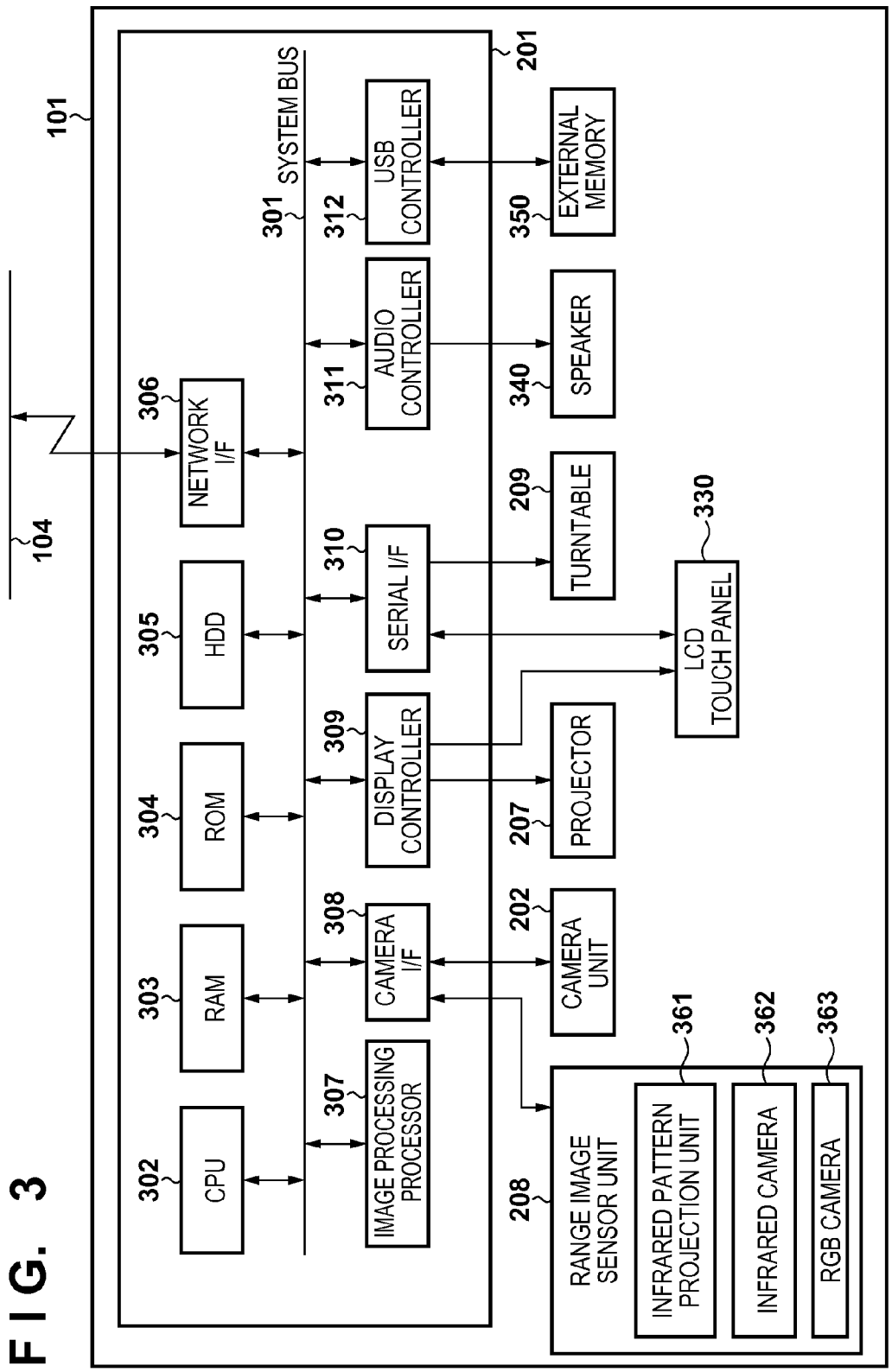
FIG. 3 is a diagram showing an example of a hardware configuration of a controller unit 201.

FIG. 3 is a diagram showing an example of the hardware configuration of the controller unit 201, which is the main body of the camera scanner 101. As shown in FIG. 3, the controller unit 201 includes a CPU 302, a RAM 303, a ROM 304, an HDD 305, a network I/F 306, an image processing processor 307, a camera I/F 308, a display controller 309, a serial I/F 310, an audio controller 311, and a USB controller 312, which are connected to a system bus 301.

The CPU 302 is a central processing unit that performs overall control of operations of the controller unit 201. The RAM 303 is a volatile memory. The ROM 304 is a non-volatile memory, and stores a boot program for the CPU 302.

The HDD 305 is a hard disk drive (HDD) that has a larger capacity than the RAM 303. The HDD 305 stores a control program for the camera scanner 101, which is executed by the controller unit 201.

The CPU 302 executes the boot program stored in the ROM 304 at the time of booting, such as when the power supply is turned on. The boot program is for reading out the control program stored in the HDD 305 and loading it to the RAM 303. After executing the boot program, the CPU 302 subsequently executes the control program loaded to the RAM 303 and performs control. Also, data to be used in operations performed according to the control program is also stored in the RAM 303 and written/read by the CPU 302. Various types of settings necessary for operations performed according to the control program, and image data generated from camera input can also be stored in the HDD 305, and are written/read by the CPU 302. The CPU 302 performs communication with other devices on the network 104 via the network I/F 306.

The image processing processor 307 reads out image data stored in the RAM 303, processes it, and writes the processed data back to the RAM 303. Note that the image processing executed by the image processing processor 307 includes rotation, zooming, color conversion, and the like.

The camera I/F 308 is connected to the camera unit 202 and the range image sensor 208, and acquires image data from the camera unit 202 and range image data from the range image sensor unit 208 and writes them to the RAM 303 in accordance with instructions from the CPU 302. It also transmits control commands from the CPU 302 to the camera unit 202 and the range image sensor 208, and performs setting of the camera unit 202 and the range image sensor 208. The range image sensor 208 includes an infrared pattern projection unit 361, an infrared camera 362, and an RGB camera 363. These members will be described later.

The controller unit 202 also further includes at least one among a display controller 309, a serial I/F 310, an audio controller 311, and a USB controller 312.

The display controller 309 controls the display of image data on a display in accordance with instructions from the CPU 302. In this case, the display controller 309 is connected to the short focus projector 207 and the LCD touch panel 330.

The serial I/F 310 inputs and outputs serial signals. In this case, the serial I/F 310 is connected to the turntable 210 and transmits instructions indicating rotation start/end and a rotation angle from the CPU 302 to the turntable 209. The serial I/F 310 is also connected to the LCD touch panel 330, and when the LCD touch panel 330 is pressed, the CPU 302 acquires the pressed coordinates via the serial I/F 310.

The audio controller 311 is connected to the speaker 340, and converts audio data into an analog audio signal and outputs audio through the speaker 340 in accordance with instructions from the CPU 302.

The USB controller 312 performs control of external USB devices in accordance with instructions from the CPU 302. In this case, the USB controller 312 is connected to an external memory 350 such as a USB memory or an SD card, and reads/writes data from/to the external memory 350.

Functional Configuration of Control Program for Camera Scanner

Figure 4:
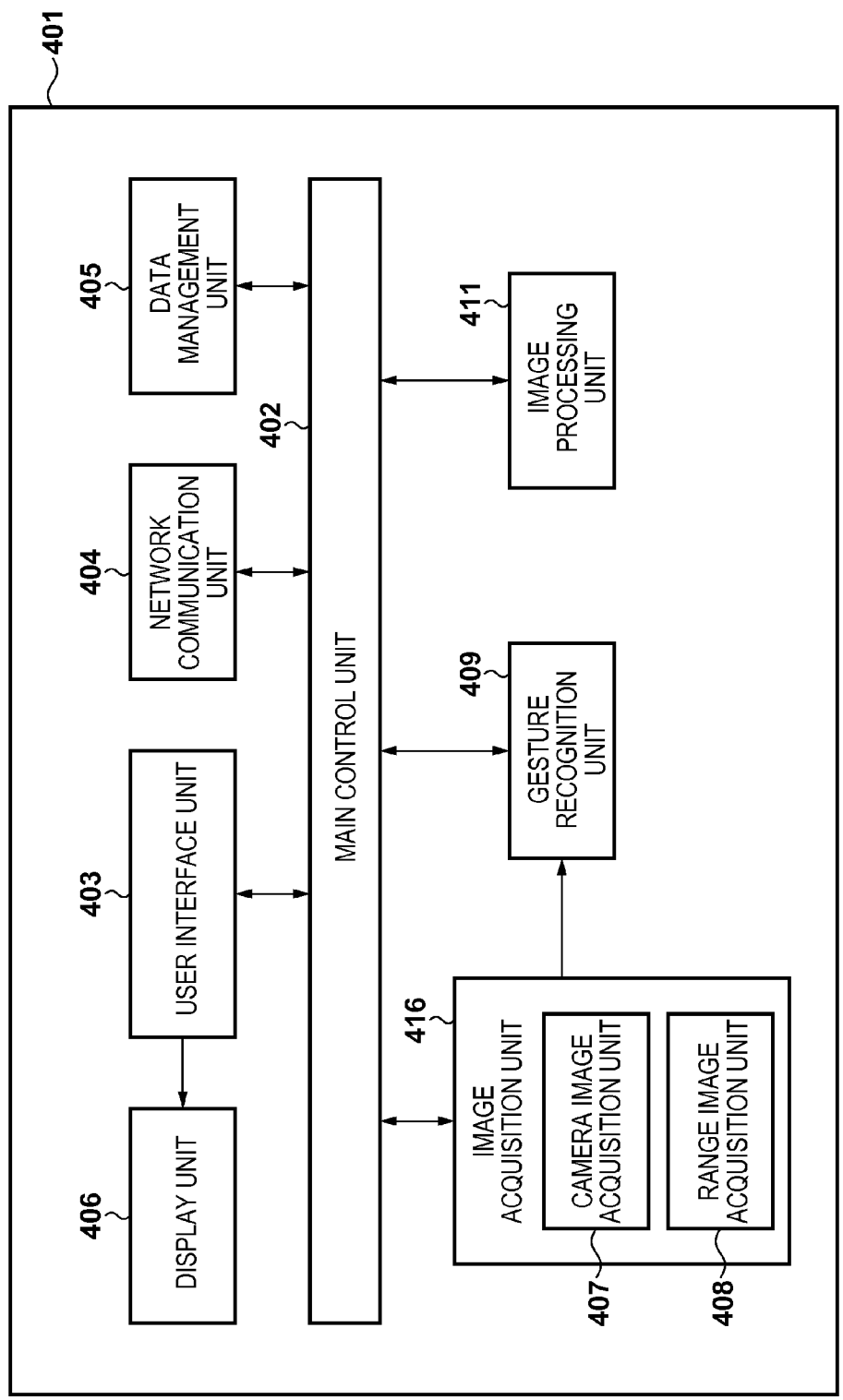
FIG. 4 is a diagram showing an example of a functional configuration of a control program of the camera scanner 101.

FIG. 4 is a diagram showing a functional configuration 401 of the control program for the camera scanner 101 that is executed by the CPU 302. The control program for the camera scanner 101 is stored in the HDD 305 and loaded to the RAM 303 and executed by the CPU 302 at the time of startup, as previously mentioned. A main control unit 402 is the control center, and controls the other modules in the functional configuration 401. An image acquisition unit 416 is a module for performing image input processing, and is configured by a camera image acquisition unit 407 and a range image acquisition unit 408. The camera image acquisition unit 407 acquires image data output by the camera unit 202 via the camera I/F 308, and stores the acquired image data in the RAM 303. The range image acquisition unit 408 acquires range image data output by the range image sensor unit 208 via the camera I/F 308, and stores the acquired range image data in the RAM 303. Details of the processing performed in the range image acquisition unit 408 will be described later with reference to FIGS. 5A to 5D.

A gesture recognition unit 409 continuously acquires images on the document stand 204 from the image acquisition unit 416, and notifies the main control unit 402 upon detecting a gesture such as a touch. Details of this processing will be described later with reference to the flowchart in FIG. 6A. An image processing unit 411 is used by the image processing processor 307 to analyze images acquired from the camera unit 202 and the range image sensor unit 208. The previously mentioned gesture recognition unit 409 is also executed using the functionality of the image processing unit 411.

A user interface unit 403 receives requests from the main control unit 402 and generates GUI components such as messages and buttons. It then requests a display unit 406 to display the generated GUI components. The display unit 406 displays the requested GUI components via the projector 207 or on the LCD touch panel 330 via the display controller 309. Since the projector 207 is installed facing the document stand 204, it can project the GUI components on the document stand 204. Also, the user interface unit 403 receives gesture operations such as touches recognized by the gesture recognition unit 409, input operations from the LCD touch panel 330 performed via the serial I/F 310, and furthermore the coordinates of these operations. The user interface unit 403 then associates the operation coordinates with the content of the operation screen being rendered and judges the operation content (e.g., a pressed button). The operation made by the operator is then received by the operation content being notified to the main control unit 402.

A network communication unit 404 performs TCP/IP communication with other devices on the network 104 via the network I/F 306. A data management unit 405 stores various types of data, such as work data generated in the execution of the control program 401, in a predetermined region of the HDD 305, and manages the stored data. One example of this data is scanned data generated by a flat original image capturing unit 411, a book image capturing unit 412, and a three-dimensional shape measuring unit 413.

Description of Range Image Sensor and Range Image Acquisition Unit

Figure 5A:
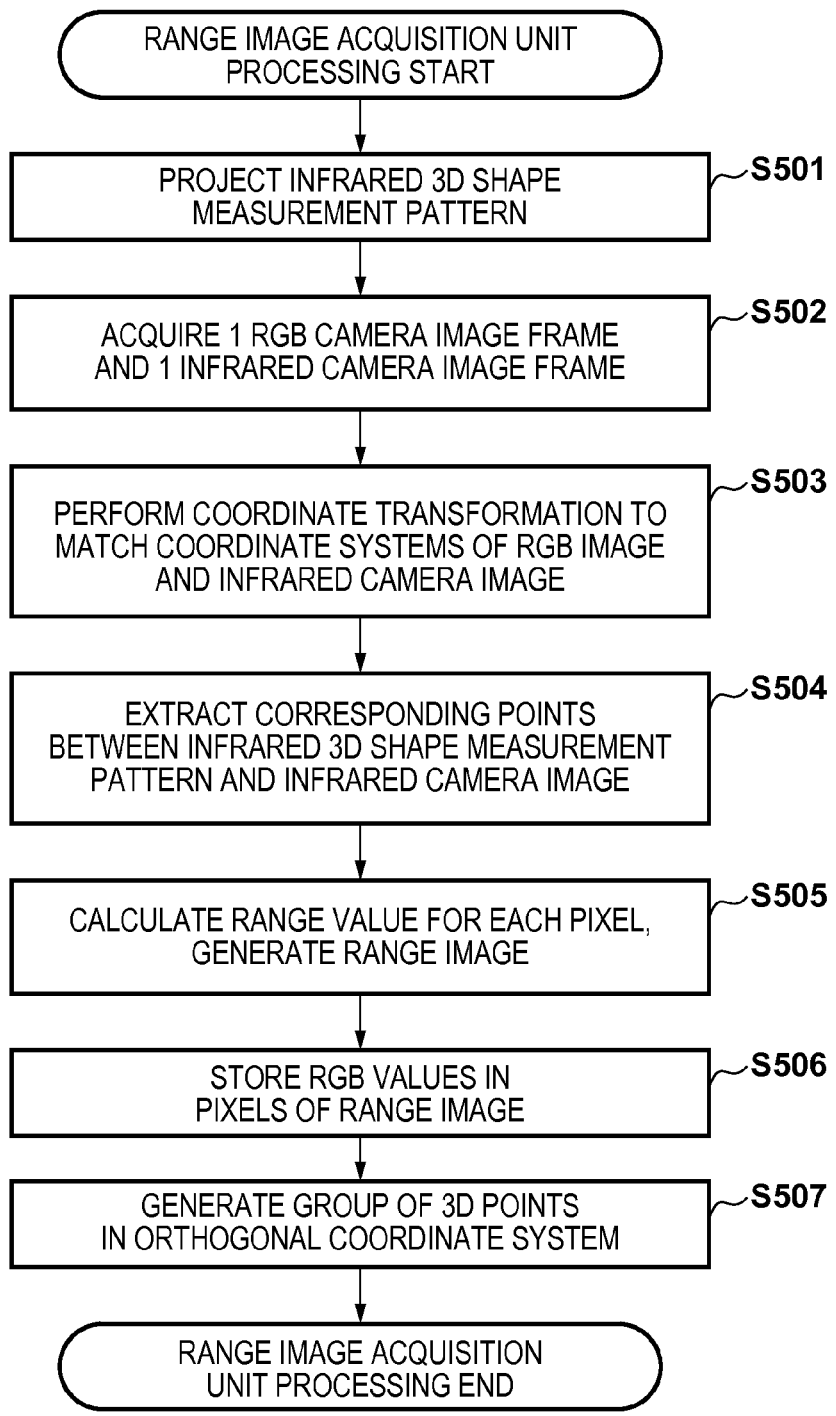
FIG. 5A is a flowchart of processing executed by a range image acquisition unit 408.
Figure 5B:
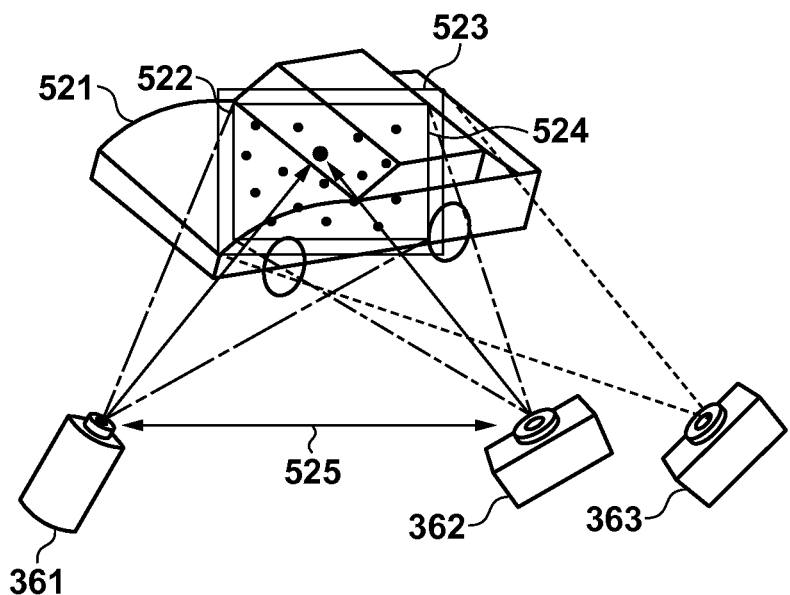
FIGS. 5B to 5D are diagrams illustrating processing executed by the range image acquisition unit 408.

FIG. 5B shows the configuration of the range image sensor 208. The range image sensor 208 is a pattern projection type of range image sensor that uses infrared light. The infrared pattern projection unit 361 projects a three-dimensional measurement pattern using infrared light, which is not visible to the human eye. The infrared camera 362 is a camera that reads the three-dimensional measurement pattern projected onto a target object. The RGB camera 363 is a camera that captures visible light that can be seen by the human eye in RGB signals.

Figure 5C:
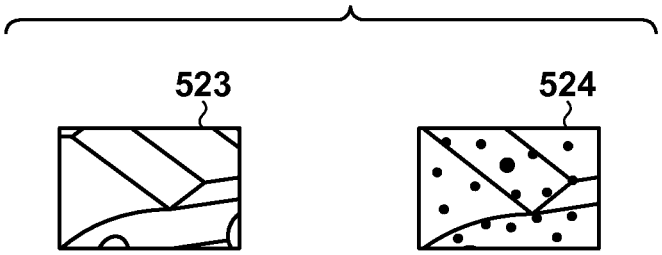
Figure 5D:
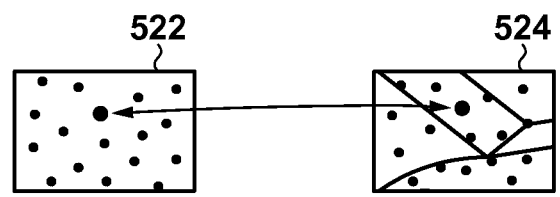

The following describes the processing performed in the range image acquisition unit 408 with reference to the flowchart in FIG. 5A. Also, FIGS. 5B to 5D are diagrams for describing the measurement principle for a pattern projection type of range image. When the range image acquisition unit 408 starts to perform processing, in step S501 the infrared pattern projection unit 361 is used to project a three-dimensional shape measurement pattern 522 onto a target object 521 using infrared light as shown in FIG. 5B. In step S502, the RGB camera 363 is used to acquire an RGB camera image 523 of the target object, and the infrared camera 362 is used to acquire an infrared camera image 524 of the three-dimensional measurement pattern 522 that was projected in step S501. Note that because the infrared camera 362 and the RGB camera 363 have different installation positions, the RGB camera image 523 and the infrared camera image 524 that are captured have different imaging regions as shown in FIG. 5C. In view of this, in step S503, the infrared camera image 524 is matched to the coordinate system of the RGB camera image 523 using coordinate system transformation from the coordinate system of the infrared camera 362 into the coordinate system of the RGB camera 363. Note that it is assumed that the relative positions of the infrared camera 362 and the RGB camera 363 and the internal parameters thereof are known in advance through preliminary calibration processing.

In step S504, corresponding points are extracted from the three-dimensional measurement pattern 522 and the infrared camera image 524 resulting from coordinate transformation in step S503, as shown in FIG. 5D. For example, a point in the infrared camera image 524 is searched for in the three-dimensional shape measurement pattern 522, and matching points that are detected are associated with each other. Alternatively, a pattern surrounding a pixel in the infrared camera image 524 may be searched for in the three-dimensional shape measurement pattern 522 and associated with the portion that has the highest degree of similarity. In step S505, the distance from the infrared camera 362 is calculated by performing calculation using the triangulation principle with a straight line connecting the infrared pattern projection unit 361 and the infrared camera 362 serving as a baseline 525. For each pixel that was associated in step S504, the distance from the infrared camera 362 is calculated and stored as a pixel value, and for each pixel that was not associated, the pixel is considered to be a portion for which the distance could not be measured, and an invalid value is stored. By performing this processing on all of the pixels in the infrared camera image 524 resulting from coordinate transformation in step S503, a range image with a distance value for each pixel is generated. In step S506, the RGB values (i.e., color information) of the RGB camera image 525 are stored in the pixels of the range image, and thus a range image having four values for each pixel (i.e., R, G, B, and distance values) is generated. The range image acquired here is based on the range image sensor coordinate system defined for the RGB camera 363 of the range image sensor 208. In view of this, in step S507, the range data obtained in the range image sensor coordinate system is transformed into a group of three-dimensional points in the orthogonal coordinate system as was described above with reference to FIG. 2B. (As previously mentioned, unless otherwise stated in particular, the term "group of three-dimensional points" refers to a group of three-dimensional points in the orthogonal coordinate system.) In this way, it is possible to acquire a group of three-dimensional points indicating the shape of the measured object.

Note that although an infrared pattern projection type of range image sensor 208 is employed in the present embodiment as described above, it is also possible to use another type of range image sensor. For example, another measuring means may be used, such as a stereo system for performing stereoscopic imaging using two RGB cameras, or a TOF (Time of Flight) system for measuring a distance by detecting the time of flight of a laser beam.

Figure 6A:
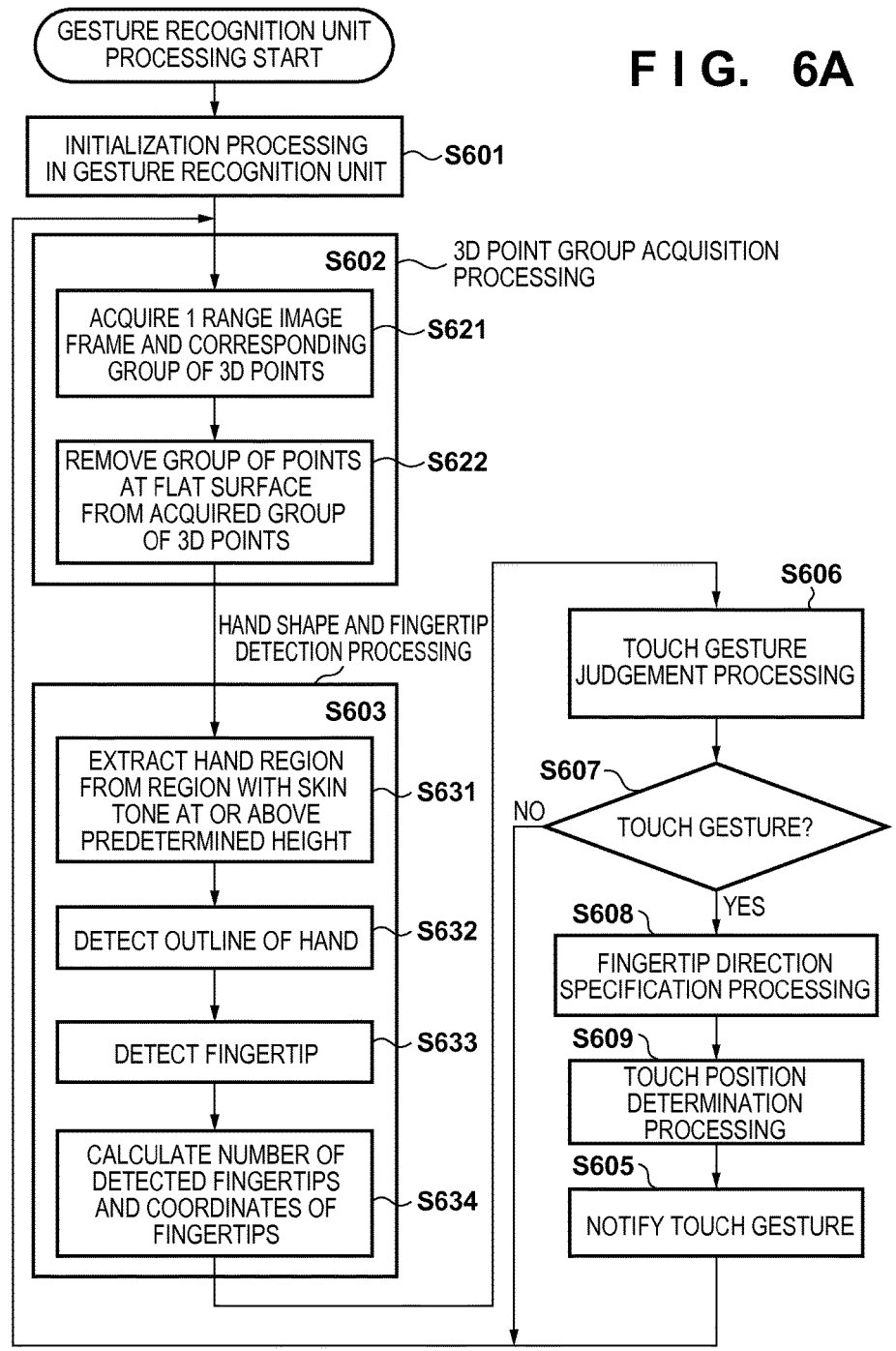
FIG. 6A is a flowchart of processing executed by a gesture recognition unit 409 according to a first embodiment.

Description of Gesture Recognition Unit gesture recognition unit 409 will be described with Details of the processing performed in the reference to the flowchart in FIG. 6A. In FIG. 6A, step S601. In initialization processing, the gesture recognition unit 409 acquires one range image frame when the gesture recognition unit 409 starts to perform processing, initialization processing is performed in from the range image acquisition unit 408. At this time, the target object has not been placed on the document stand 204 when the gesture recognition unit starts to perform processing, and therefore recognition is performed on the flat surface of the document stand 204 as the initial state. Specifically, the largest plane is extracted from the acquired range image, and the position and normal vector thereof (hereinafter, called the plane parameters of the document stand 204) are calculated and stored in the RAM 303.

Next, in step S602, a group of three-dimensional points of an object located on the document stand 204 is acquired as shown in steps S621 to S622. At this time, in step S621, one range image frame and the corresponding group of three-dimensional points are acquired from the range image acquisition unit 408. In step S622, the plane parameters of the document stand 204 are used to remove the group of points at the plane that includes the document stand 204 from the acquired group of three-dimensional points.

Figure 6B:
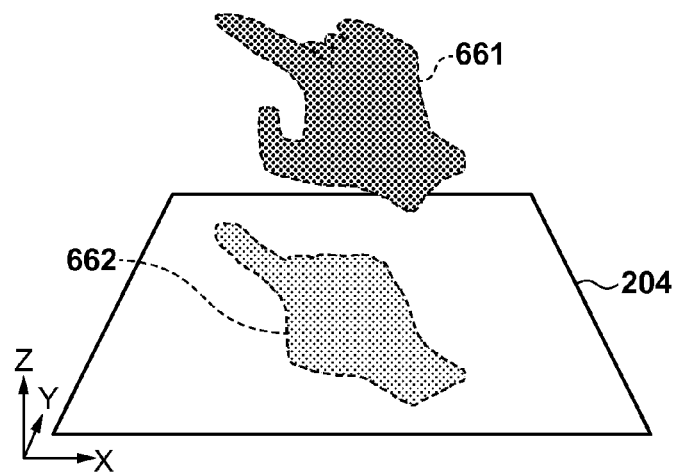
FIGS. 6B to 6E are diagrams illustrating processing executed by the gesture recognition unit 409 according to the first embodiment.

In step S603, processing for detecting the shape of the user's hand and a fingertip from the acquired group of three-dimensional points is performed as shown in steps S631 to S634. This will be described below with reference to FIGS. 6B to 6E, which are diagrams schematically illustrating a fingertip detection processing method. In step S631, the group of three-dimensional points corresponding to a hand is obtained from the group of three-dimensional points acquired in step S602, by extracting a group of three-dimensional points that have a skin tone (the color of a hand) and are at or higher than a predetermined height (distance) from the plane that includes the document stand 204. A group of three-dimensional points 661 in FIG. 6B indicates the extracted group of three-dimensional points corresponding to a hand, that is to say a hand region. Note that the term "skin tone" here does not refer to a specific color, and is a collective term that covers various colors of skin. The skin tone may be determined in advance, or may be able to be selected by the operator.

Also, the hand region may be discovered without using a skin tone, by subtracting the background of the range image. The discovered hand region can be transformed into a group of three-dimensional points using the above-described method.

Figure 6C:
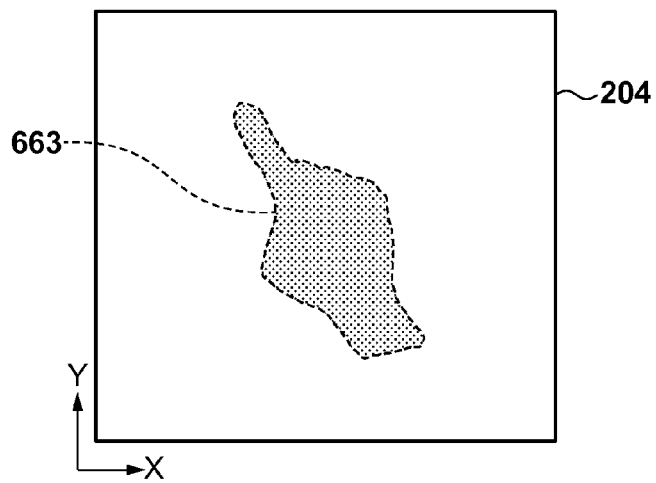

In step S632, a two-dimensional image in which the acquired group of three-dimensional points corresponding to the hand is projected onto the plane of the document stand 204 is generated, and the outline of the hand is detected. A group of two-dimensional points 662 in FIG. 6B indicates the group of three-dimensional points projected onto the plane of the document stand 204. This projection need only be the projection of the coordinates of the group points using the plane parameters of the document stand 204. Also, as shown in FIG. 6C, the range image can be handled as a two-dimensional image 663 viewed from the z axis direction by taking only the values of the xy coordinates from the projected group of three-dimensional points. In this case, it is assumed that the correspondence between the points of the group of three-dimensional points of the hand and coordinates in the two-dimensional image projected onto the plane of the document stand 204 is stored in advance.

In step S633, fingertip detection is performed. The following describes several methods for discovering a fingertip. First, a method that uses the curvature of the outline (i.e., contour) of the hand will be described.

For each point on the detected outline of the hand, the curvature of the outline at that point is calculated, and the point at which the calculated curvature is greater than a predetermined value is detected as the fingertip. The following describes how the curvature is calculated. Contour points 664 in FIG. 6E indicate a portion of the points indicating the outline of the two-dimensional image 663 projected onto the plane of the document stand 204. Here, the curvature of the outline of the hand is calculated by performing circle fitting employing the method of least squares on a finite number of adjacent contour points among the points indicating the outline such as the contour points 664. This is performed on all of the contour points of the outline, and if the center of a circle that fits and has a curvature greater than a predetermined value is inside the outline of the hand, the point in the middle of the finite number of adjacent contour points is determined as the fingertip. As previously described, the RAM 303 stores the correspondence relationship between the contour points of the outline of the hand and the group of three-dimensional points, and therefore the gesture recognition unit 409 can make use of three-dimensional information regarding the fingertip points. Whether the center of the circle is inside or outside the outline of the hand can be judged by, for example, finding the contour points on a line that is parallel with a coordinate axis that passes through the center of the circle, and then making the judgment based on the positional relationship between the found contour points and the center of the circle. Out of the contour points and the center of the circle, if the center of the circle is at an odd-numbered position from the end of the line, it can be judged that the center of the circle is outside the outline of the hand, and if the center of this circle is at an even-numbered position from the end, it can be judged that the center of the circle is inside the outline of the hand.

Figure 6D:
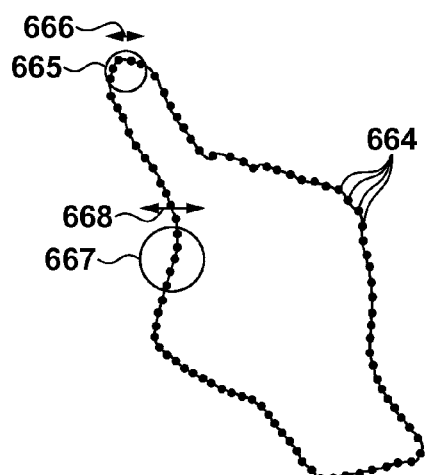
Figure 6E:
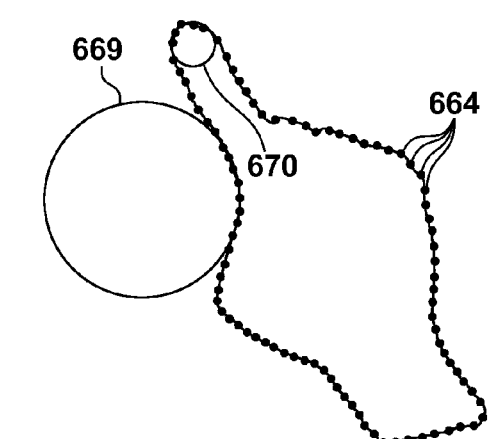

Circles 669 and 670 in FIG. 6E indicate examples of fitted circles. The circle 669 has a curvature smaller than the predetermined value, and the center thereof is outside the outline, and therefore this circle is not detected as a fingertip, whereas the circle 670 has a curvature greater than the predetermined value, and the center thereof is inside the outline, and therefore this circle is detected as a fingertip.

Also, although a method of discovering a fingertip by calculating curvatures using circle fitting employing the method of least squares is used in this example, a fingertip may be discovered by finding the circle that encloses a finite number of adjacent contour points and has the smallest radius. The following describes an example of this.

FIG. 6D schematically illustrates a method of detecting a fingertip based on circles that enclose a finite number of contour points. For example, assume that circles are drawn so as to include five adjacent contour points. Circles 665 and 667 are examples of these circles. This kind of circle is successively drawn for all of the contour points of the outline, and if the diameter of a circle (e.g., 666 or 668) is smaller than a predetermined value, the point at the middle (center) of the five adjacent contour points is considered to be the fingertip. Although five adjacent points are used in this example, there is no limitation to this number. Also, although a method of discovering a fingertip by fitting circles is described above, a fingertip may be discovered by fitting ellipses. An example of discovering a fingertip using ellipse fitting is described in T. Lee and T. Hollerer, Handy AR: Markerless Inspection of Augmented Reality Objects Using Fingertip Tracking. In Proc. IEEE International Symposium on Wearable Computers (ISWC), Boston, Mass., October 2007, and this method may be used.

The aforementioned circle fitting and ellipse fitting can be easily realized by using an open source computer library such as OpenCV.

Figure 7A:
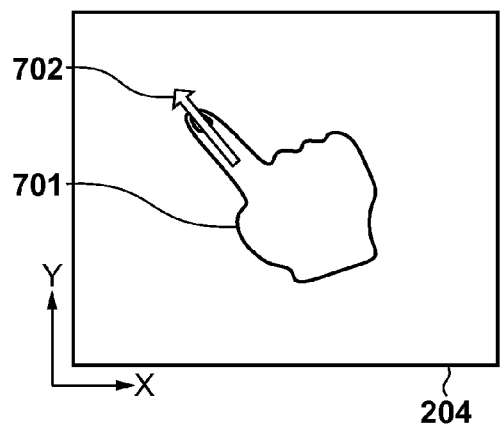
FIGS. 7A to 7F are diagrams schematically showing a method for estimating a fingertip position according to the first embodiment.
Figure 7B:
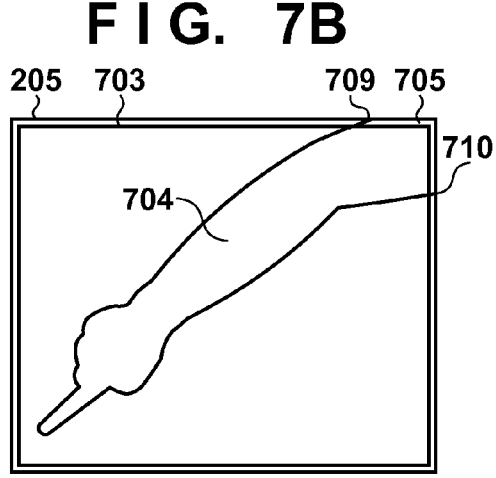

Alternatively, the point that is the farthest away from the arm may be discovered as the fingertip. FIG. 7B shows a state in which an arm 704 is included in the scanning region 205. This state can be thought to be the result of the aforementioned group of three-dimensional points of the hand region being projected onto the plane of the document stand 204. The number of pixels in this projection image is the same as that in the range image obtained by the range sensor 208. A region 703 is a region enclosed by lines that are a predetermined number of pixels inward of the outer frame of the projection image. A region 705 is a region obtained by combining the region of the arm 704 with the thin region between the scanning region 205 and the region 703. Points 709 and 710 at which the arm 703 enters the scanning region 205 can be discovered using the region 705. The range image acquired by the range sensor 208 may be directly processed to perform this processing. At this time, the region of the arm 704 is obtained by obtaining the difference between the background image of the range image stored in the RAM 303 and the current range image, and performing binarization with a predetermined threshold value.

Figure 7C:
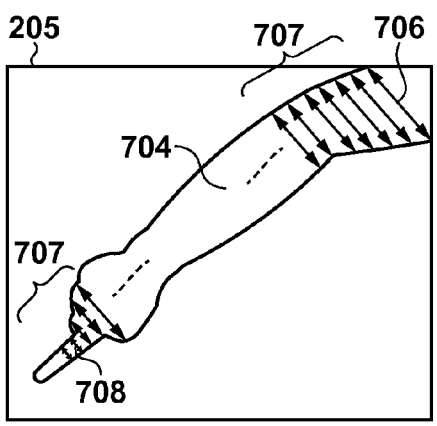
Figure 7D:
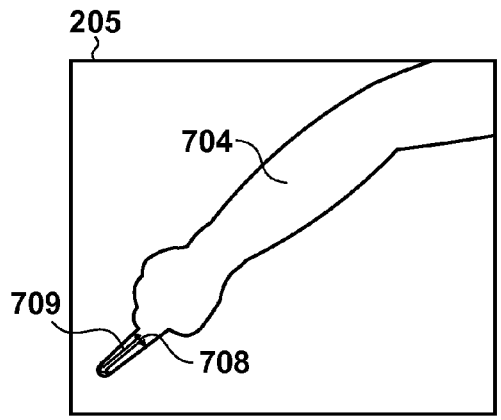
Figure 7E:
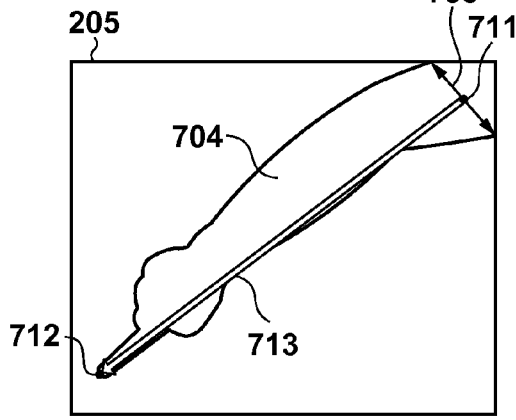

A line segment 706 in FIG. 7E is the line segment that connects the point 709 and the point 710. Also, 711 indicates the midpoint of the line segment 706, and this point is assumed to be the base of the arm. The fingertip can then be determined by considering the pixel that is on the outline of the arm and is the farthest away from the arm base point 711 to be a fingertip point 712. Also, although the midpoint of the arm entry positions is obtained to obtain the arm base point here, the base and fingertip may be obtained by thinning the arm 704 itself. Thinning can be realized using a thinning algorithm in ordinary image processing. Among the points of the thinned arm, the point that intersects the region 705 may be determined to be the base of the arm, and the point at the opposite end may be detected as the fingertip.

In step S633, a fingertip can be detected using any of the above methods.

In step S634, the number of detected fingertips and the coordinates of these fingertips are calculated. The correspondence relationship between the points in the two-dimensional image projected onto the document stand 204 and the group of three-dimensional points of the hand has been stored as previously mentioned, and therefore the three-dimensional coordinates of the fingertips can be obtained at this time. Although a method of detecting a fingertip in an image obtained by projecting a group of three-dimensional points onto a two-dimensional image is described here, the image subjected to fingertip detection is not limited to this. For example, a configuration is possible in which a hand region is extracted from a skin tone region in an RGB image or the result of performing background subtraction on a range image, and then a fingertip in the hand region is detected using a method similar to any of the above-described methods (e.g., calculating the curvature of the outline). In this case, the coordinates of the detected fingertip are coordinates in a two-dimensional image, such as an RGB image or a range image, and therefore the coordinates need to be transformed into three-dimensional coordinates in the orthogonal coordinate system using the range information of the range image at the coordinates.

In step S606, touch gesture judgment processing is performed. At this time, the gesture recognition unit 409 calculates the distance between the fingertip detected in the immediately previous step and the plane that includes the document stand 204. The three-dimensional coordinates of the detected fingertip and the previously-described plane parameters of the document stand 204 are used in this calculation. If the distance is less than or equal to a predetermined very small value, the determination "touch gesture" is made, and if the distance is greater than the predetermined very small value, the determination "no touch gesture" is made.

Also, touch detection may be performed by providing a virtual threshold plane (not shown) at a predetermined height (Z direction) in the orthogonal coordinate system, and determining whether the Z value of the fingertip coordinates is smaller than the Z value of the threshold plane.

Next, in step S607, if the determination "touch gesture" was made in the immediately previous step, the procedure moves to step S608, and if the determination "no touch gesture" was made, the procedure returns to step S602.

In step S608, fingertip direction specification processing is performed. The term "fingertip direction" refers to the direction of an arrow 702 in the example in FIG. 7A. In other words, the fingertip direction is the same as the direction in which the finger of the hand 701 is pointing in the plane of the document stand 204. In order to specify the fingertip direction, finger portion specification is performed. To achieve this, first, the portion of the arm entering the scanning region 205 is specified. As previously described, the point 709 and the point 710 in FIG. 7B can be discovered as the points at which the arm 704 enters the scanning region 205.

Next, a finger portion is specified. The line segment 706 in FIG. 7C is the line segment that connects the point 709 and the point 710. Line segments 707 that are parallel with the line segment 706 are drawn in the region of the arm 704 (hereinafter also called the arm region 704) at a predetermined very small interval. The portion in which the lengths of the line segments are smaller than a predetermined threshold value is specified as the fingertip. In FIG. 7C, the lengths of the line segments are less than or equal to the predetermined threshold from the position of a line segment 708.

Next, the fingertip direction is specified. A vector 709 from the coordinates of the midpoint of the line segment 708 toward the fingertip coordinates in the xy plane that were discovered in step S633 is defined. The direction of the vector 709 is the direction of the fingertip, and the length represents the length of the finger. The vector 709 can be specified as, for example, the vector whose initial point is the midpoint of the line segment 708 and whose terminal point is the fingertip position specified in step S634. Also, in the case where the fingertip coordinates were obtained using the method described with reference to FIG. 7E, a vector 713 connecting the arm base point 711 and the fingertip point 712 may be determined as the direction vector of the finger. In this case, the length of the finger needs to be obtained using the above-described method. Note that there is no need to obtain the vector 709 in this case. In view of this, for example, the point of intersection between the vector 713 and, out of the group of line segments 707 whose lengths are shorter than the aforementioned predetermined threshold value (i.e., the upper limit of the finger width), the line segment closest to the arm base point 711 or an extension line thereof is obtained, and that point is considered to be the arm base position. The distance from that point to the fingertip point 712 can be determined as the length of the finger. Of course, it is possible to obtain the vector 709 using the above-described method, and determine the length of the finger based on this vector.

Figure 7F:
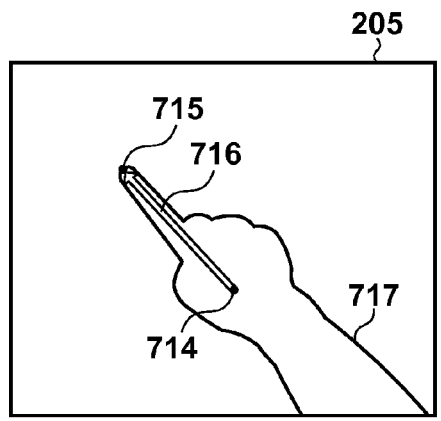

Also, as shown in FIG. 7F, a vector that connects a central point 714 of the palm (back of the hand) and a fingertip point 715 may be determined as a direction vector 716 of the finger. At this time, the central point 714 of the palm (back of the hand) can be obtained as the point in the hand region that is greatest distance from each of the pixels constituting a contour 717 of the hand region.

Furthermore, in the case of performing ellipse fitting on the fingertip, the direction connecting the two focal points of the ellipse may be determined as the direction vector of the finger. At this time, it is sufficient that the midpoint of the points at which the arm enters the scanning region, which are obtained using the above-described method, is determined as the origin point of the direction of the vector. In this case as well, the length of the finger needs to be obtained using the above-described method.

Although an example in which the above processing is limited to the finger pointing orientation has been described, in a state in which the five fingers are opened as well, the directions and lengths of all of the fingers can be obtained by performing the above processing on each of the line segments 708 obtained for the respective fingers.

When step S608 ends, the procedure moves to step S609. In step S609, touch position determination processing is performed. This is processing for estimating the position of the finger pad at which the user actually feels the touching. A group of two-dimensional points 801 in FIG. 8A indicates an image of a hand region in an xy plane projected on the document stand 204. An enlarged portion 803 is an enlarged view of a portion 802 of this image. In the case of a finger 804, a vector 805 is the fingertip direction vector 709 that was obtained in step S608. Here, the xy coordinates of a point obtained by shifting a fingertip point 806 in the xy plane by a predetermined amount (i.e., shifted by a predetermined distance 807) in the direction opposite to the vector 805 are determined as the coordinates of a touch point 808 and stored in a predetermined region of the RAM 303. It is assumed that the predetermined distance for shifting is a changeable setting. The z coordinate of the touch point in this case may be set to zero, or the z coordinate may be determined based on the corresponding point in the group of three-dimensional points. Note that the position of the fingertip 806 may be the fingertip position that was specified in step S634.

Also, the method for determining the touch position (finger pad) is not limited to a method of shifting the fingertip point by a predetermined distance as described above. For example, as shown in FIG. 8B, a center 810 of a circle 809 used in circle fitting when a fingertip is discovered may be determined as the touch position.

Also, as shown in FIG. 8C, out of the focal points (812, 813) of an ellipse 811 fitted to the fingertip, the point 812 on the fingertip side may be determined as the touch position. At this time, in order to determine which of the focal points is on the fingertip side, it is sufficient to use the one that is farther from the previously-described base of the arm.

Furthermore, the centroid of the pixels that make up the outline of the fingertip may be determined as the touch position. FIG. 8D is a diagram schematically illustrating the relationship between the pixels making up the outline of the fingertip and the centroid. A group of pixels 814 that makes up the outline of the fingertip indicates adjacent pixels among the pixels at the contour points that make up the outline of the arm and were used when the above-described fingertip discovery was performed. Among these pixels, the group of pixels 814 includes nine pixels that were discovered as the fingertip, and it is assumed that a pixel 806 at the middle was discovered as the fingertip. Also, 815 indicates the centroid of the group of pixels 814 that includes the fingertip point 806, and it is sufficient that the centroid 815 is determined as the touch position.

Also, as shown in FIG. 8I, a center of gravity 826 of the finger pixels included in a predetermined peripheral region 825 surrounding the fingertip point 806 may be determined as the touch position. At this time, the predetermined peripheral region is not limited to a circle as shown in FIG. 8I. Also, the vector connecting the center of gravity 826 to the fingertip point 806 may be used as the fingertip direction vector.

Also, a configuration is possible in which polygonal approximation is performed on the pixels making up the outline of the fingertip, and the center of gravity of the polygon is determined as the touch position. FIG. 8E schematically illustrates polygonal approximation performed on the outline of the fingertip. A pentagon 816 indicates a polygon approximated to the outline of the fingertip. The center of gravity of this pentagon is represented by a point 817, and therefore it is sufficient that the point 817 is determined as the touch position. Polygonal approximation can be easily executed using a publicly-disclosed open source API such as OpenCV.

Furthermore, the touch position may be determined using the fingertip direction vector and the circle used in fitting when fingertip discovery was performed. FIG. 8F is a diagram schematically illustrating a method for determining the touch position using the fingertip direction vector and the circle used in fitting when fingertip discovery was performed. A vector 818 represents a vector extended from the fingertip direction vector. Out of the intersections between the vector 818 and the circle 809 that was fitted to the fingertip, a point 819 closer to the tip of the vector is obtained as a virtual fingertip. This virtual fingertip point is different from the fingertip point that was used when performing touch detection. A point obtained by shifting the virtual fingertip point 819 by the predetermined distance 807 in the direction opposite to the fingertip direction vector may be determined as a touch position 820.

Similarly, the touch position may be determined using the fingertip direction vector and an ellipse that was fitted to the fingertip. FIG. 8G schematically illustrates a method for determining the touch position using the fingertip direction vector and an ellipse that was fitted to the fingertip. Out of the intersections between the vector 818 extended from the fingertip direction vector and an ellipse 811, a point 821 on the fingertip side is set as the virtual fingertip. It is sufficient that a point 822 obtained by shifting the virtual fingertip 821 by a predetermined distance in the direction opposite to the fingertip direction vector is determined as the fingertip point.

The above processing can be performed in the case of using a two-dimensional image obtained by projecting the group of three-dimensional points of the hand onto the plane of the document stand 204, or a range image acquired from the range image sensor 208.

Additionally, the touch position may be determined using an RGB image. Furthermore, in the case of using an RGB image, the touch position may be determined by discovering a nail. FIG. 8H is an enlarged view of the fingertip 805, and schematically illustrates the determination of the touch position based on a nail region in an RGB image. A nail 823 indicates a nail region discovered in the RGB image. The nail region can be discovered by searching for differences in the luminance value from the surrounding finger region. It is sufficient that the centroid of the discovered nail region is obtained and determined as the touch position. At this time, alignment has been performed between the RGB image and the range image as previously described, and therefore the centroid of the nail region can be easily transformed into a corresponding position in the range image or the two-dimensional image obtained by projecting the group of three-dimensional points of the hand onto the plane of the document stand 204.

The touch position (finger pad position) touched on the flat surface can be estimated using methods such as those described above.

When step S609 ends, the procedure moves to step S605. In step S605, the judged touch gesture and the three-dimensional coordinates of the touch position are notified to the main control unit 402, and then the procedure returns to step S602, and gesture recognition processing is repeated.

Note that although gesture recognition with one finger is described in the present embodiment, the present embodiment can be applied to gesture recognition with multiple fingers or multiple hands. For example, if the procedure in FIG. 6A is repeated to periodically acquire touch positions, various gestures can be specified based on the presence/absence of touches, changes in the touch position, and the like. The main control unit 402 is a portion that executes an application. Upon receiving a touch gesture, the main control unit 402 executes corresponding processing defined in the application.

According to the present embodiment, it is possible to capture an image of a fingertip and a flat surface from above using a range image sensor, and specify an accurate touch position on the flat surface using a range image.

Second Embodiment

Figure 9:
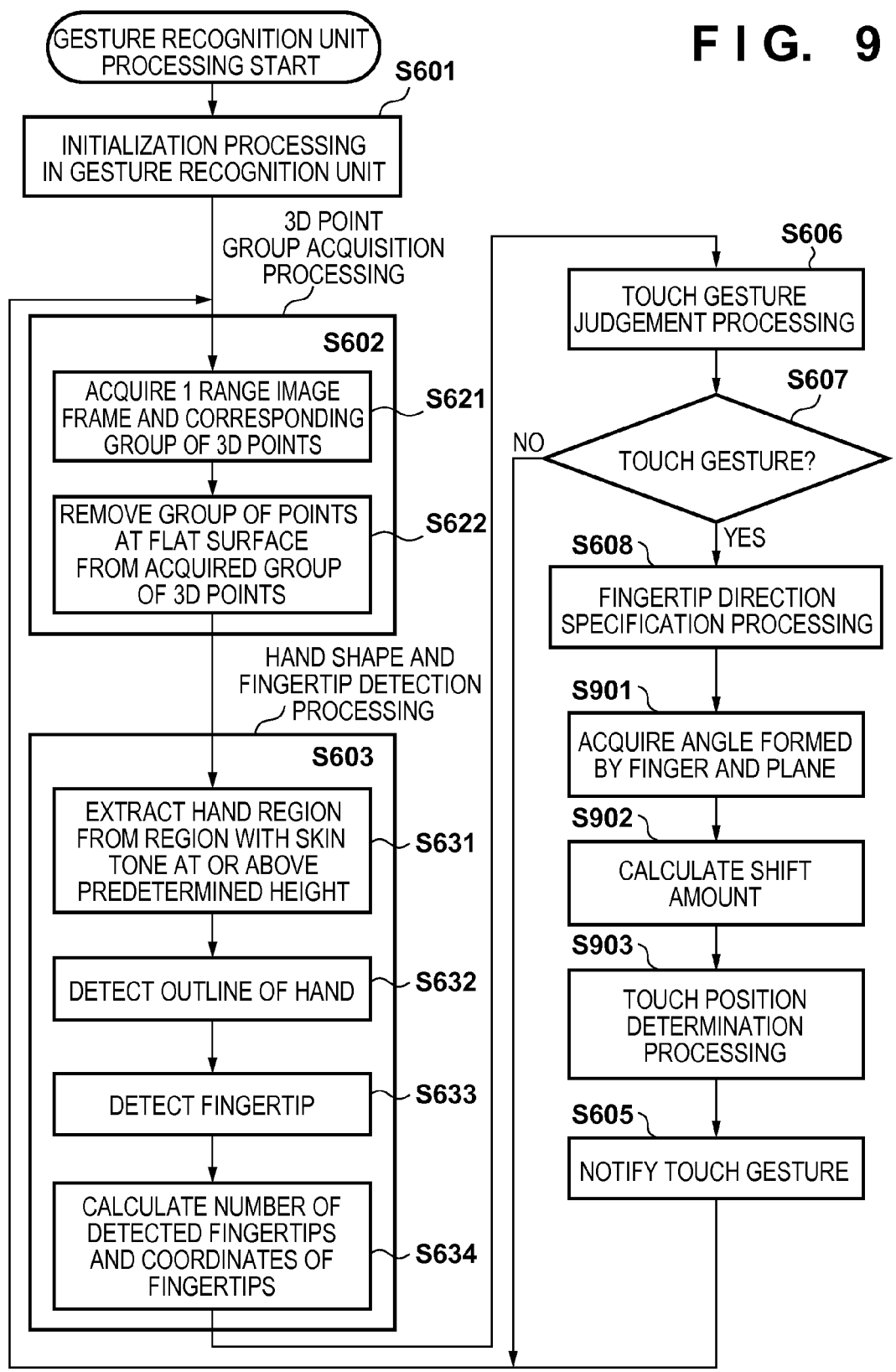
FIG. 9 is a flowchart of processing executed by the gesture recognition unit 409 according to a second embodiment.
Figure 10A:
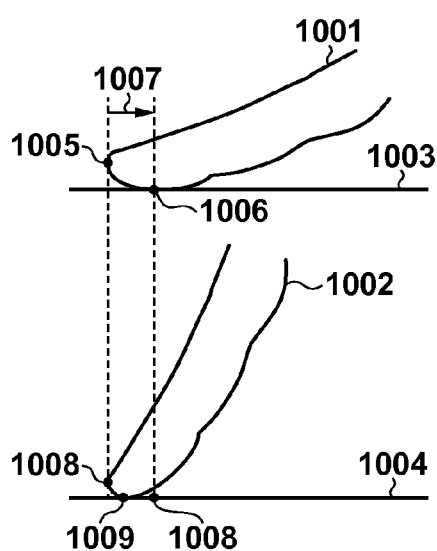
FIGS. 10A to 10E are diagrams schematically illustrating a method for estimating a touch position based on angle information of a finger relative to a plane according to the second embodiment.

The first embodiment describes the fundamental portion of a method for determining a touch position in the case of capturing an image of a fingertip and a flat surface from above using a sensor. In order to determine the touch position, a method is employed in which the coordinates of the touch position are determined by discovering a fingertip in a range image acquired by a range image sensor, and shifting the coordinates of the fingertip position by a predetermined distance in the direction opposite to the fingertip direction. The present embodiment describes a method for improving operability in the case where the user desires to give a more detailed touch instruction, by performing touch position correction and specifying or estimating the corrected position as the touch position, and this description will be given with reference to the flowchart of FIG. 9 showing processing executed by the gesture recognition unit 409. FIG. 10A schematically illustrates a case in which touch position correction is necessary. The upper portion in FIG. 10A is a side view of a finger 1001 touching a plane 1003, which is part of the document stand 204. In this case, a fingertip position 1005 represents the three-dimensional point of the fingertip discovered using a method the same as any of the methods described in the first embodiment. In the method described in the first embodiment, the touch position point is determined by shifting the fingertip coordinate indicating the position of the fingertip by a user-defined predetermined value 1007, and this touch position point is indicated by a touch position 1006. The lower portion of FIG. 10A shows the case in which the angle of the finger 1002 relative to the plane 1004 is larger than in the upper portion of the figure. In this case, the touch position point obtained using the same method as in the first embodiment is indicated by a position 1008, but the point of actual contact with the plane is indicated by a position 1009. If the fingertip position is merely shifted by a predetermined fixed amount in order to the obtain the touch point in this way, depending on the angle of the fingertip relative to the plane it is possible for the point obtained as the touch position point to deviate from the actually touched point or the point that the user feels was touched. In view of this, in the present embodiment, the angle of the fingertip is used when obtaining the amount that the fingertip position is to be shifted in order to obtain the touch position point.

The steps indicated as step S6xx in the flowchart in FIG. 9 have already been described with reference to FIG. 6 in the first embodiment. The following description focuses on the steps indicated as step S9xx, which are different from the first embodiment.

After the fingertip direction vector 709 is specified in step S608, the gesture recognition unit 409 obtains the angle formed by the finger and the plane of the document stand 204 in step S901. The fingertip direction vector 709 that was obtained in step S608 is used at this time. The fingertip direction vector 709 is a two-dimensional vector in the plane of the document stand 204, that is to say in the xy plane. This vector is indicated as vectors 1010 and 1012 in the side views in FIG. 10B. The initial points and the terminal points of the vectors 1010 and 1012 are associated with points in the previously-described group of three-dimensional points of the hand. This association has already been performed when the group of three-dimensional points was projected onto the plane in previously-described step S603. In the example in the upper portion of FIG. 10B, the initial point of the vector 1010 can be associated with a three-dimensional point 1018, and the terminal point can be associated with a three-dimensional point 1005. For example, the intersections between the surface made up of the group of three-dimensional points of the hand and a straight line that passes through the end points of the vector and is parallel to the z axis are used as the respective end points of the three-dimensional vectors. Since the group of three-dimensional points of the hand form the surface of the hand, there can be two intersections for each straight line, but as long as intersections on the same side (i.e., the side with the lower z component or the side with the higher one) are used for the end points, either of them may be used. In the examples shown in FIGS. 10A to 10E, the intersections with the larger z component are used. Of course, this is merely one example. If a vector 1011 with the three-dimensional points 1018 and 1005 respectively serving as the initial point and terminal point is obtained in this way, it is used as the three-dimensional vector of the finger. A three-dimensional vector 1013 of the finger can be obtained in a similar manner. An angle 1020 formed by the vector 1010 and the vector 1011, and an angle 1022 formed by the vector 1012 and the vector 1013 are obtained as angles formed by the finger and the plane.

Figure 10C:
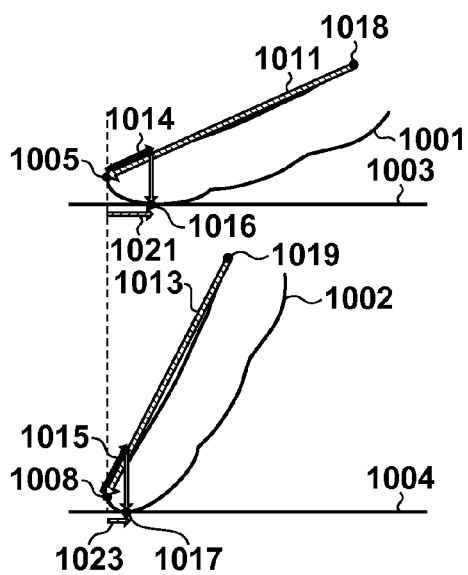
Figure 10B:
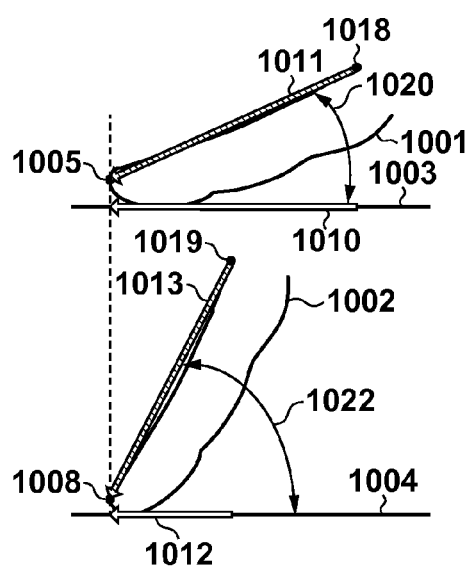

Next, in step S902, calculation is performed to obtain the amount that the fingertip position is to be shifted in order to obtain the touch position. FIG. 10C is a diagram schematically illustrating how a shift amount is determined using the angle of the finger relative to the plane, which was obtained in step S901. First, the upper portion of FIG. 10C will be described. A vector 1014 is assumed to have the three-dimensional point 1005 of the fingertip as its initial point, have a unit vector in the direction opposite to the three-dimensional vector 1018 of the finger, and have a user-designated predetermined length. A point 1016 is a point obtained by projecting the terminal point of the vector 1014 onto the xy plane 1003 along the z axis, and this point is used as the touch position that is to be obtained. In the lower portion of 10C as well, a touch position 1017 can be obtained using the same method. In this way, if positions shifted by a predetermined distance from the tip of the finger in the direction opposite to the fingertip direction vector are projected onto the xy plane (i.e., the operation surface), it is possible to shift the touch position forward/backward according to the angle of the finger relative to the plane, thus making it possible to provide a touch position that does not diminish the user touch sensation.

Figure 10D:
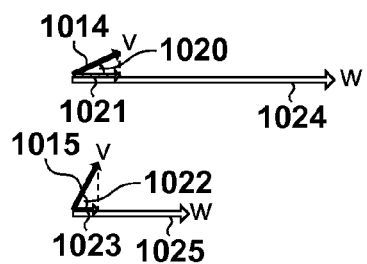

The operation of obtaining the touch positions 1016 and 1017 is the same as an operation for obtaining vectors 1021 and 1023 that have the fingertip point as their initial point in the xy plane of the document stand 204. As shown in FIG. 10D, a vector 1024 and a vector 1025 are respectively vectors in the direction opposite to the vector 1010 and the vector 1012. Letting a vector v be the vectors 1014 and 1015, a vector w be the vectors 1024 and 1025, and a vector x be the vectors 1021 and 1023 that are to be obtained, the vector x is the result of orthogonal projection of the vector v onto the vector w. Letting e be the angles 1020 and 1022, a vector v', which is the orthogonal projection of the vector v onto the vector w, is expressed by the following equation using the angle θ.

$$v'=(|v||w|\cos\theta/|w|)\times w/|w| \quad (4)$$

In Equation 4, w/|w| is a unit vector in the same direction as the vector w, and therefore the constant "|v||w|cos θ/|w|"=|v|cos θ is the magnitude of the vector v' that is to be obtained, that is to say the shift amount by which the fingertip position is to be shifted in the xy plane to the touch position. Note that since the vector w is in the xy plane, the orthogonal projection v' of the vector v relative to the vector w can be obtained by substituting 0 for the z component of both the initial point and the terminal point of the vector v.

In step S903, the gesture recognition unit 409 determines the terminal point of the vector v', which has the fingertip position as the initial point and was obtained in step S902, as the touch position. In other words, the fingertip position is shifted by the shift amount obtained in step S902 along a two-dimensional vector in the fingertip direction in the xy plane, and the coordinates of the shifted fingertip position are determined as the touch position and stored in the RAM 303.

By performing the above processing, it is possible to change the touch position according to the angle between the fingertip direction and the operation flat surface, and more accurately specify the touch position.

Also, as can be understood from FIG. 10C as well, a correction amount 1023 in the case where the finger 1002 is standing relative to the plane (the lower portion of FIG. 10C) is smaller than a correction amount 1021 in the case where the finger 1001 is lying down relative to the plane (the upper portion of FIG. 10C). Based on this assumption, the correction amount may be determined using the position touched by the user. The user's fingertip tends to be lying down more often when touching a distant position from the user viewpoint than when touching a nearby position. Accordingly, it is sufficient to determine the touch position by shifting the position from the fingertip by a large correction amount when the position is distant and by a small correction amount when the position is nearby. The distance from the user to the touch position can be measured based on the distance from the arm base point, which was described in the first embodiment, to the fingertip point.

Figure 10E:
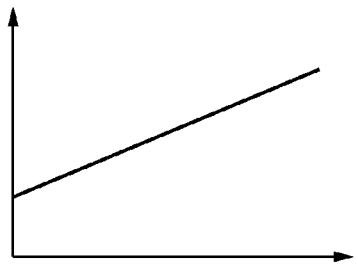

FIG. 10E is a graph schematically illustrating an example of the relationship between the distance from the user to the touch position and the correction amount. The horizontal axis indicates the distance from the user, and the vertical axis indicates the correction amount. Although a linear graph is shown in FIG. 10E, there is no limitation to being linear. Using the above-described processing as well, it is possible to easily correct the touch position according to the angle between the fingertip and the plane.

Third Embodiment

The first and second embodiments describe the fundamental portion of a touch position determination method and a method for determining a touch position according to the angle of a finger relative to a flat surface in the case of capturing an image of the fingertip and the flat surface from above using a sensor. These methods are successful if the range image sensor 208 has little noise.

Figure 12A:
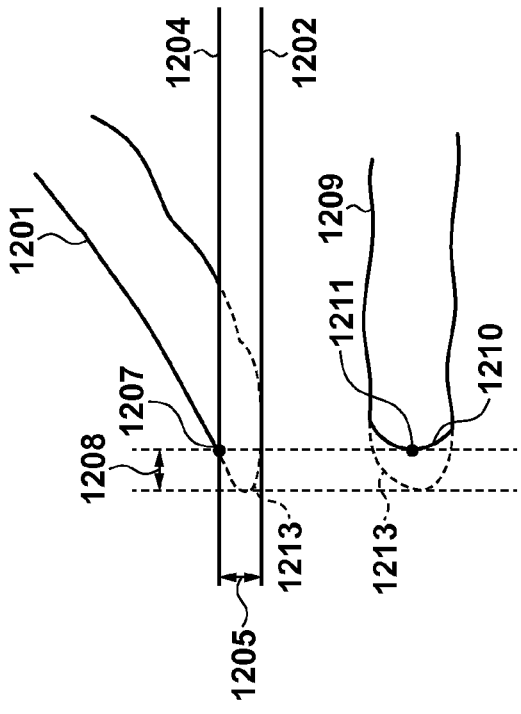
FIGS. 12A to 12D are diagrams schematically illustrating a method for estimating a touch position based on RGB image information and angle information regarding a plane according to a fourth embodiment.
Figure 12B:
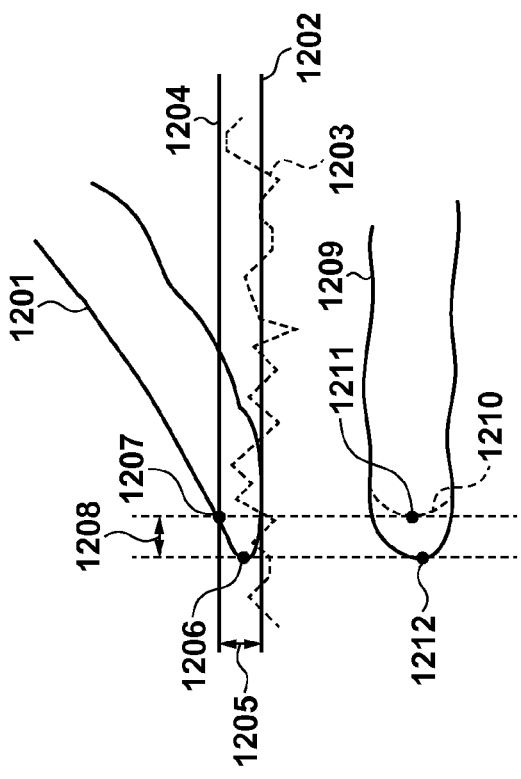

The following describes the influence that noise of the range image sensor 208 has on the detection of a touch position on a flat surface. The upper portion of FIG. 12A schematically shows a side view of the touching of a finger 1201 on a plane 1202 and plane range information 1203 actually acquired by the range image sensor. Since the positional relationship between the range image sensor 208 and the document stand 204 is fixed, ideally the plane range information acquired by the range image sensor 208 is constant. However, since a certain extent of noise is added in actuality, the plane range information of the document stand 204 contains fluctuation in the time axis direction. At the stage of being acquired as range information, the plane range information obtained by the range image sensor includes noise as shown in the range information 1203 in FIG. 12A, and thus is acquired in the state of including variation. When obtaining the plane parameters as previously described, they are obtained by calculating the average of this variation. The variation is different for each range image frame acquired by the range image sensor 208 depending on the fluctuation in the time axis direction. The plane of the document stand 204, that is to say the previously-described plane parameter plane, is indicated by the plane 1202 in FIG. 12A. In contrast, with current ordinary range image sensors, the range information 1203 of the acquired range image exhibits rising and falling variation of approximately ±3 mm. For this reason, when extracting the group of three-dimensional points at a predetermined height or higher as the fingertip in step S631 in previously-described FIG. 6A, it is necessary to prevent erroneously detecting the time-direction fluctuation of noise added at the plane as described above. In order to achieve this, a predetermined height 1205 of approximately 5 mm is needed as a margin for absorbing variation in a surface that should originally be a flat surface in the range image. In FIG. 12A, 1204 indicates a plane set at the predetermined height 1205 (approximately 5 mm) from the plane 1202. As previously described, when detecting the hand region, the portion below the plane 1204 needs to be removed along with the plane, and therefore the three-dimensional points 1206 of the fingertip are removed if they are below the plane 1204. Among the remaining unremoved points at this time, the virtual fingertip point that can be detected as the fingertip is the point 1207 in the plane 1204. The lower portion of FIG. 12A schematically illustrates the upper portion as viewed from above (the state of the xy plane). The fingertip point 1206 corresponds to the point 1212, and the virtual fingertip point 1207 corresponds to the point 1211. The region of the finger 1209 on the left side of a dashed line 1210 cannot be detected. In the case of FIG. 12B, the portion enclosed by dashed lines 1213 is removed from the hand region. Only the portion enclosed by solid lines is extracted as the hand region. In this case, a distance 1208 indicating the difference between the true three-dimensional point 1206 of the fingertip and the virtual fingertip point 1207 (1211) is 5 mm to 10 mm.

Figure 11:
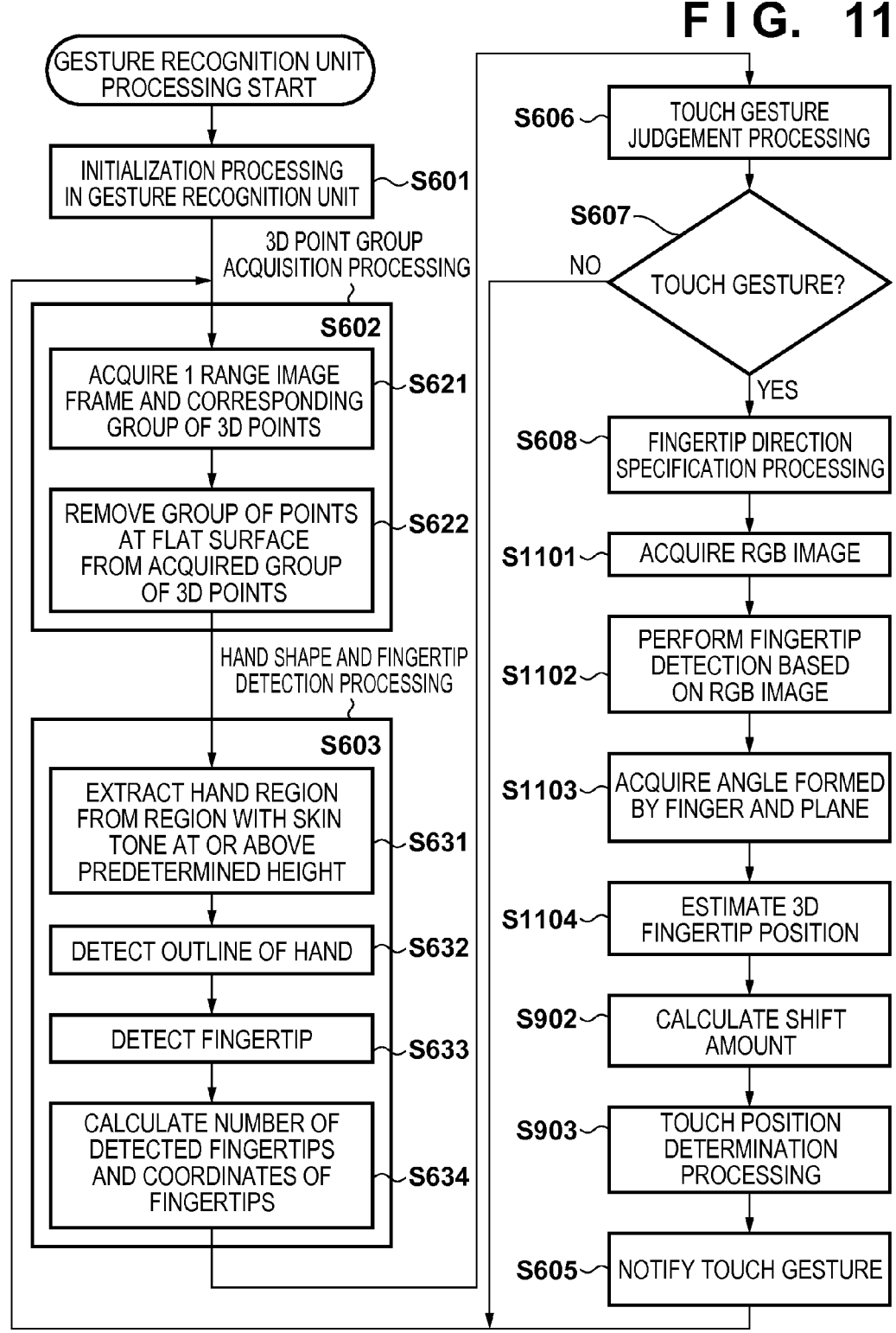
FIG. 11 is a flowchart of processing executed by the gesture recognition unit 409 according to a third embodiment.

In the methods performed in the first embodiment and the second embodiment, the touch position is determined based on the assumption that the fingertip position is acquired accurately. For this reason, if the range image includes noise as described above, it is difficult to determine an accurate touch position. If the touch position is detected using the virtual fingertip point 1207, the touch position deviates from the actual touch position by approximately 5 mm to 10 mm as described above. In view of this, in the present embodiment, an accurate touch position is determined using an RGB image that has less noise than the range image and is acquired at the same time. This method will be described using the flowchart of FIG. 11, which shows processing executed by the gesture recognition unit 409. The portions indicated as step S6xx and step S9xx in FIG. 11 are portions that were described with reference to FIGS. 6 and 9, and thus descriptions will not be given for them.

After the fingertip direction vector 709 is specified in step S608, in step S1101 the gesture recognition unit 409 uses the image acquisition unit 416 to acquire a color image that the range image sensor 208 acquired using the RGB camera 363, that is to say, acquires an RGB image.

Figure 12C:
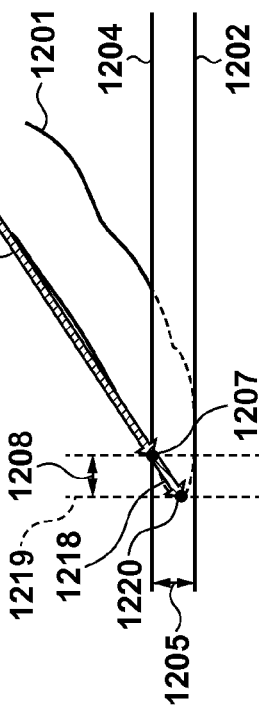

In step S1102, the gesture recognition unit 409 performs fingertip detection on the acquired RGB image. First, a hand region needs to be detected in the RGB image, similarly to the processing performed on the range image. For this reason, a difference image is obtained between the background image that was stored in advance in the RAM 303 at the time of startup (the image of the document stand 204 with nothing placed thereon) and the RGB image that was acquired in step S1101. Alternatively, a skin tone region is detected in the RGB image that was acquired in step S1101. Thereafter, by performing processing similar to steps S633 and S634 in FIG. 6, it is possible to discover a two-dimensional fingertip position in the xy plane. FIG. 12C shows the finger in the RGB image displayed in a superimposed manner over the finger 1209 captured in the range image in the xy plane image. At this time, the fingertip obtained using the range image is indicated by 1211. Also, a portion 1214 enclosed in dashed lines is the region of the finger that is the difference between the RGB image and the range image. A point 1215 indicates the fingertip discovered using the RGB image.

In step S1103, the gesture recognition unit 409 acquires the angle formed by the finger and the plane. This processing is processing similar to the processing of step S901 in FIG. 9. At this time, in step S1103, the fingertip point 1211 acquired using the range image is used for the fingertip coordinates.

Figure 12D:
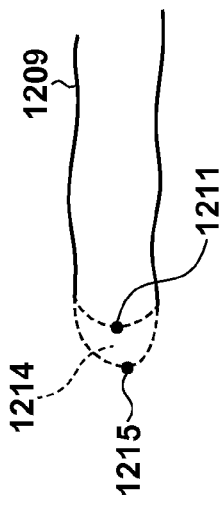

In step S1104, the gesture recognition unit 409 estimates the true three-dimensional fingertip position. The true three-dimensional fingertip position is the three-dimensional coordinates of the fingertip that were removed along with noise as previously described. A vector 1216 in FIG. 12D is a three-dimensional vector that indicates the fingertip direction obtained in the immediately previous step S1103 (also called the finger vector). This three-dimensional vector of the finger is obtained using the virtual three-dimensional fingertip position 1207 as the tip. A dashed line 1219 is a side view of a plane 1219 that passes through the two-dimensional fingertip position 1212 obtained from the RGB image and is orthogonal to the orthogonal projection of the finger vector 1216 onto the plane 1202. The vector 1216 is extended toward the terminal point side, and a point 1220 of intersection with the plane 1219 is estimated as the true three-dimensional fingertip position. The x and y components of the point 1210 respectively match the x and y components of the point 1212, and therefore the point 1220 can be specified by obtaining the z component of the point 1210 that corresponds to the slope of the vector 1216 and the z component of the point 1207. A vector 1218 represents the vector corresponding to the extended portion. A vector obtained by adding the vector 1216 and the vector 1218 is used as the true finger three-dimensional vector in the following processing. When step S1104 ends, the procedure moves to step S902. The processing from hereon is processing similar to the processing described with reference to FIG. 9. In other words, a point moved back by the predetermined distance from the fingertip position 1220 in the direction opposite to the finger vector is projected onto the xy plane, and that point is estimated as the touch position. At this time, processing is performed using the above-described finger three-dimensional vector as the finger three-dimensional vector.

According to the above processing even if the precision of the range image sensor is poor, it is possible to estimate the three-dimensional fingertip position and determine the touch position.

Fourth Embodiment

The third embodiment describes a method for discovering a three-dimensional fingertip position using an RGB image and determining a touch position in the case where the range image includes noise. The present embodiment describes a method for discovering a true three-dimensional fingertip position using only a range image (i.e., without using an RGB image) and determining a touch position.

Figure 14A:
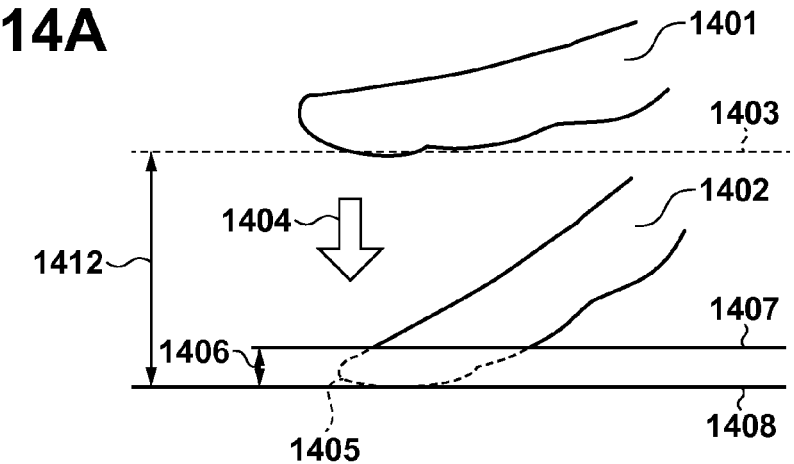
FIGS. 14A to 14C are diagrams schematically illustrating a method for estimating a touch position according to the fourth embodiment.

FIG. 14A schematically shows a change from a finger 1401 immediately before touching a plane 1408 to a finger 1402 that has been lowered in the direction of an arrow 1404 and is touching the plane. As described in the third embodiment as well, if the range image includes noise, it is necessary to set a plane threshold value (or planarity threshold value) at a position at a predetermined height 1406. For this reason, a tip portion 1405 of the finger 1402 in the touching state is removed along with the plane such that the fingertip is missing, and therefore it is difficult to directly discover the true three-dimensional fingertip position. However, since the finger 1401 immediately before the touch is at a position higher than the predetermined height 1406, the fingertip is not missing. The length of the finger in this state is stored and used in the estimation of the fingertip position after the touch.

Figure 13:
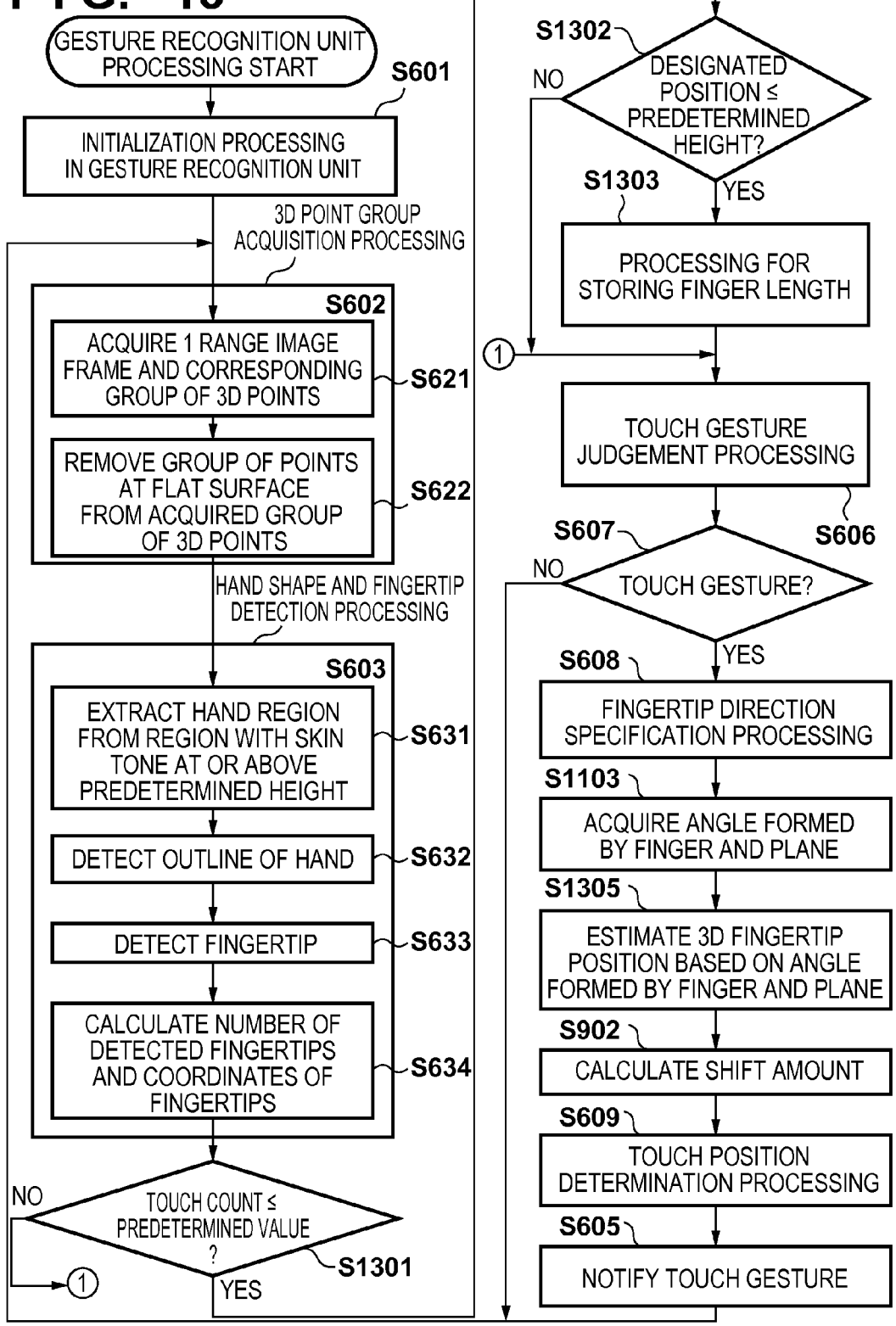
FIG. 13 is a flowchart of processing executed by the gesture recognition unit 409 according to the fourth embodiment.

This method will be described in detail using the flowchart of FIG. 13, which shows processing executed by the gesture recognition unit 409. Among the steps in FIG. 13, the steps indicated as steps S6xx, S9xx, and S11xx are similar to the steps described in the flowcharts of FIGS. 6, 9, and 11, and therefore will not be described in detail.

After fingertip detection is performed in step S603, in step S1301 the gesture recognition unit 409 checks whether or not a below-described touch count is less than or equal to a predetermined value. The touch count referred to here is a numerical value indicating the number of times that a touch on the plane has been performed since processing started in the gesture recognition unit 409. If the judgment "touch gesture" is made in step S607, the touch count is incremented and stored in the RAM 303. If the touch count is less than or equal to the predetermined value, the procedure moves to step S1302, whereas if it is greater than the predetermined value, the procedure moves to step S606.

In step S1302, the gesture recognition unit 409 checks whether or not the fingertip position is at a predetermined height or lower. The predetermined height referred to here is the height indicated by 1412 in FIG. 14A. This height needs to be set higher than the height 1406 for avoiding noise. The height 1412 is for ensuring that the finger is at a position sufficiently farther away than the plane 1407 is, and therefore the height 1412 is set in the range of being greater than the height 1406 and less than the height of the finger during normal operation, for example approximately double the height 1406. If the height 1406 has been set to approximately 5 mm, it is sufficient that the height 1412 is set to 10 to 20 mm. If the fingertip position is at the predetermined height or lower, the procedure moves to step S1303, whereas if it is higher than the predetermined height, the procedure moves to step S606.

In step S1303, the gesture recognition unit 409 executes processing for storing the length of the finger. At this time, the gesture recognition unit 409 obtains a finger three-dimensional vector 1411 using the same method as in step S901 described in the second embodiment. The length of this finger three-dimensional vector 1411 is stored in a predetermined region of the RAM 303.

The processing of steps S1301 to S1303 is executed until the touch count exceeds a predetermined count, and a configuration is possible in which the finger three-dimensional vector is acquired the corresponding number of times, and the average value of the lengths is obtained.

Next, when the specification of the fingertip direction of the touch on the operation surface in step S608 ends, in step S1305 the gesture recognition unit 409 performs processing for estimating a three-dimensional fingertip position based on the angle formed by the finger and the plane. At this time, the virtual finger three-dimensional vector 1414 that was obtained in step S1103 is extended to the finger length obtained in steps S1301 to S1303 while maintaining the initial point position. The extended finger three-dimensional vector is a vector 1416. A tip 1417 of this vector is used as the true three-dimensional fingertip point. Using this true three-dimensional fingertip point makes it possible to determine a touch position in the subsequent steps similarly to the first and second embodiments.

Figure 14B:
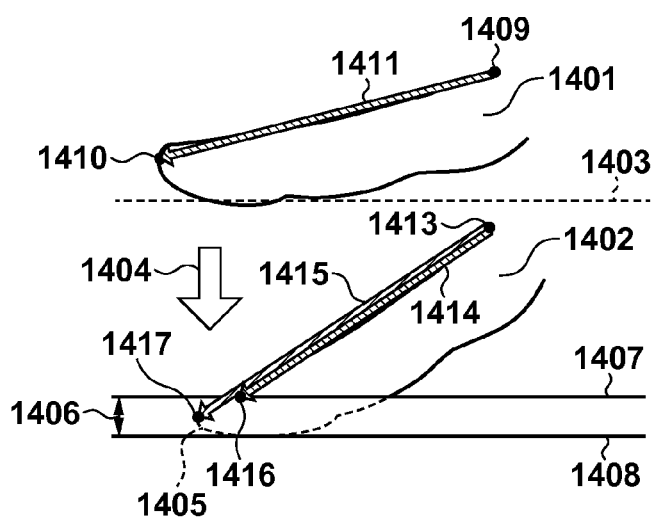

The present embodiment is directed to the case in which the aforementioned plane threshold value is constant relative to the flat surface and greater than or equal to a predetermined value. However, depending on the environment, the sensor sensitivity changes according to the location of the flat surface, and therefore there are cases in which the plane threshold value (the height 1406 in FIGS. 14A to 14C) is changed according to the location. In such a case, there are cases where the true three-dimensional fingertip position needs to be estimated for each location, and also cases where this is not necessary. In such cases, threshold values may be stored in advance for various flat surface locations. The location is specified in region sections or the like in the operation flat surface. A configuration is possible in which, as shown in step S1501 of the flowchart in FIG. 15, it is judged whether or not the plane threshold value of the touched position is less than or equal to a predetermined value, and if the plane threshold value exceeds the predetermined value, it is determined that steps S1103, S1305, and S902 are to be performed. Similarly, in the case of estimating the true fingertip three-dimensional position based on an RGB image as well, processing may be switched according to threshold values set for respective flat surface locations.

Note that although the finger length is stored if the fingertip is lower than the predetermined height 1412 in the above processing, a configuration is possible in which the finger length is stored when the fingertip is passed over the range image sensor, for example, at the first startup.

Also, although the touch position is determined in steps S902 and S609 after the true three-dimensional fingertip position is estimated in step S1305 in the flowchart, this sequence may be reversed. First, while the fingertip has not made a touch, the correction amount (i.e., the position of the finger pad) is calculated using processing similar to that in steps S902 and S609. In step S1303, the length from the finger base to the finger pad is stored in addition to the obtained finger length. After a touch gesture is detected, processing similar to that in step S1305 may be performed using the previously-stored length to the finger pad, and then an accurate touch position may be estimated.

Figure 14C:
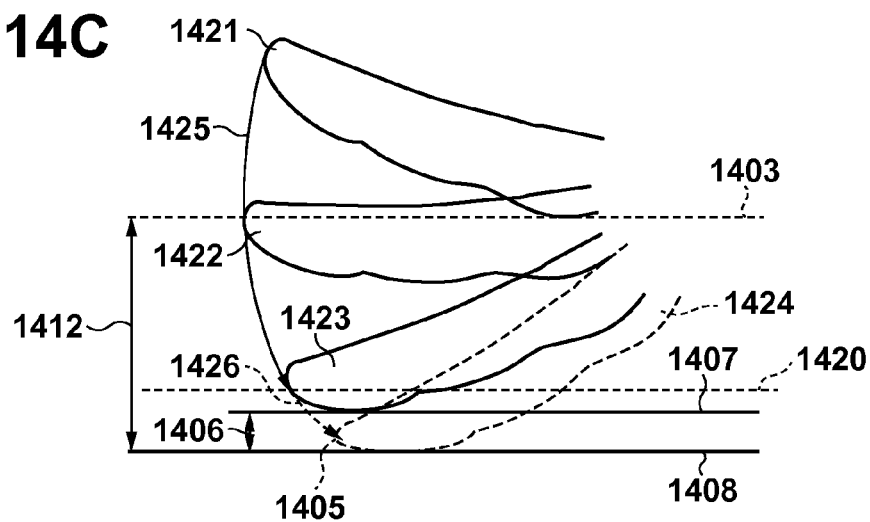

Also, although a method for estimating an accurate touch position using the angle and the length of the finger is described in the above processing, an accurate touch position may be estimated by storing the trajectory of the fingertip. FIG. 14C is a diagram schematically showing the estimation of a fingertip position during a touch using the trajectory of the fingertip position. Positions 1421, 1422, and 1423 indicate finger positions that are consecutive in a time series immediately before a touch is made.

A position 1424 indicates the position of the finger at a predicted touch position, and the fingertip at this time is below the height 1406 for avoiding noise, and therefore the correct fingertip position cannot be discovered in this case. A trajectory 1425 indicates the trajectory of the fingertip. A trajectory 1426 indicates the predicted trajectory of the fingertip. Here, a threshold value is provided at a predetermined position 1420 that is higher than the height 1406 for avoiding noise. The trajectory of the fingertip is stored in the RAM 303 until the height-direction coordinate value in FIG. 14C is less than or equal to the threshold value 1420, and then the stored trajectory is used to predict the subsequent fingertip trajectory. It is sufficient that the trajectory is stored by successively storing a three-dimensional straight line that connects two points, using the current fingertip position and the immediately previous fingertip position. In this case, if the direction vector of the trajectory in the direction of the straight line is obtained, the point of intersection between this direction vector and the plane 1408 of the document stand (or a virtual plane provided at a predetermined height above the flat surface of the document stand) is used as the predicted fingertip point.

Also, instead of storing the two current and immediately previous points, a configuration is possible in which a predetermined number of most recent fingertip positions are stored in the RAM 303, and an approximate curve that passes through the predetermined number of fingertip positions is obtained in a three-dimensional space. In this case, the point of intersection between the three-dimensional curve and the plane 1408 of the document stand (or a virtual plane provided at a predetermined height above the flat surface of the document stand) is used as the predicted fingertip point. The virtual plane provided at a predetermined height above the plane 1408 of the document stand is not shown in the figures. Taking into consideration the thickness of a finger, this virtual plane is a plane set higher than the actual plane 1408 of the document stand by an amount corresponding to the thickness of a finger. If the fingertip position is estimated, the touch position (finger pad position) can be obtained using any of the previously-described methods.

Also, although the sequence of first estimating the fingertip position at the time of the touch using the trajectory of the fingertip, and then obtaining the position of the finger pad is described in the above method, this sequence may be reversed. Specifically, a configuration is possible in which the finger pad position estimation processing is performed using the previously-described method for each frame, and then the touch position is estimated by obtaining the trajectory of the finger pad position.

Also, although a method of always storing the finger trajectory is described above, the storage of the trajectory may be started when the finger is lowered to a predetermined height or lower, from the viewpoint of not reducing CPU performance. In the case of FIG. 14C, it is sufficient that a threshold value is provided at the height 1412, and the storage of the finger trajectory is started when the fingertip is lowered to the threshold value or lower.

Furthermore, as a method for simplified calculation of the finger trajectory, the fingertip position may be predicted by obtaining a straight line that connects two points at predetermined heights. For example, the coordinates of the fingertip are stored when the finger crosses threshold values 1403 and 1420 in FIG. 14C in order from above, and the straight line that three-dimensionally connects these coordinates is obtained.

The point of intersection between this straight line and the plane 1408 of the document stand may be used as the predicted fingertip point.

According to the above processing, it is possible to estimate an accurate touch position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-170886, filed Aug. 25, 2014 and Japanese Patent Application No. 2015-010680, filed Jan. 22, 2015 and Japanese Patent Application No. 2015-147083, filed Jul. 24, 2015, which are hereby incorporated by reference herein in their entirety.

What is claimed is:

1. An apparatus for specifying an operation performed on an operation surface, the apparatus comprising:
   an image sensor installed at a position upward from the operation surface and configured to sense a distance from respective positions of a plurality of positions of a target object placed on the operation surface;
   a memory storing instructions; and
   one or more processors which execute the instructions and cause the apparatus to function as units comprising:
   (1) a first acquisition unit that acquires distances from the image sensor to respective positions of a plurality of positions of a target object placed on the operation surface;
   (2) a first determination unit that determines that the target object performs a touch gesture against the operation surface in a case where the distance acquired by the first acquisition unit is less than or equal to a predetermined value;
   (3) a first specification unit that specifies a tip of the target object that is determined to have performed the touch gesture in an image having the distances acquired by the first acquisition unit;
   (4) a second specification unit that specifies a direction of the target object in the image having the distances;
   (5) a second acquisition unit that acquires an angle formed by the direction of the target object and the operation surface using the image having the distances; and
   (6) a second determination unit that determines, as the touch position on the operation surface, a position shifted by a predetermined amount in the specified direction of the target object from the specified tip of the target object,
   wherein the predetermined amount is a first amount in a case where the acquired angle is a first angle, and
   wherein the predetermined amount is a second amount that is smaller than the first amount in a case where the acquired angle is a second angle that is larger than the first angle.

2. The apparatus according to claim 1, wherein the second determination unit determines the touch position by shifting the position of the tip of the target object in a region of the target object projected onto the operation surface by the predetermined amount on the operation surface in the direction opposite to the direction of the target object, the shifted direction being determined according to the direction of a three-dimensional image of the target object in a three-dimensional space whose bottom surface is the operation surface.

3. The apparatus according to claim 1, wherein the second determination unit determines the touch position by (a) shifting the position of the tip of the target object by the predetermined amount in the direction opposite to the direction of a three-dimensional image of the target object in a three-dimensional space whose bottom surface is the operation surface and (b) projecting the shifted position onto the operation surface.

4. The apparatus according to claim 3, wherein the one or more processors execute the instructions and further cause the apparatus to function as a unit that acquires a color image of the operation surface and a region in a three-dimensional space whose bottom surface is the operation surface,
   wherein the first specification unit specifies the position of the tip of the target object on the operation surface based on a color of a hand region in the color image, and
   wherein the second determination unit (a) obtains, as a corrected position of the tip, a position extended to the position of the tip on the operation surface that was specified by the first specification unit in the direction of the target object in the image having the distances that was specified by the second specification unit, (b) shifts the corrected position of the tip by the predetermined amount in the direction opposite to the direction of the target object, (c) projects the shifted position onto the operation surface, and (d) determines the projected position as the touch position.

5. The apparatus according to claim 1, wherein the second specification unit determines the center of a palm or the back of a hand, and specifies a direction of a fingertip from the center of a palm or the back of a hand as the direction of the tip of the target object.

6. The apparatus according to claim 1, wherein the second determination unit determines a center of gravity of pixels forming a finger included in a predetermined peripheral region of the tip of the target object as the touch position.

7. The apparatus according to claim 3, wherein the target object is a hand,
   wherein the one or more processors further cause the apparatus to function as:
   (1) a detection unit that detects a touch on the operation surface by a finger of the hand based on the operation surface and the position of the tip of the finger included in the three dimensional image;
   (2) a judgment unit that judges that the tip of the finger is at a predetermined distance or less from the operation surface in a case where the detection unit has not detected a touch on the operation surface; and
   (3) a measurement unit that measures a finger length from a region of the target object in a case where the tip of the finger is at the predetermined distance or less, and
   wherein the second determination unit (a) obtains, as a corrected position of the tip of the finger, a position obtained by shifting the position of the tip of the finger by the finger length measured by the measurement unit in the direction of the target object in the image having the distances that was specified by the second specification unit, (b) shifts the corrected position of the tip of the finger by the predetermined amount in the direction opposite to the direction of the target object, (c) projects the shifted position onto the operation surface, and (d) determines the projected position as the touch position.

8. The apparatus according to claim 7, wherein the measurement unit (a) calculates a curvature of an outline based on an outline of the region of the target object, and (b) specifies a point at which the curvature is smaller than a predetermined value as the position of the tip of the finger, and
   wherein the measurement unit (a) specifies a location at which the region of the target object enters the operation surface based on an image obtained by projecting the three-dimensional image onto the operation surface, (b) specifies, beginning from the specified location, a position at which the width of the region of the target object is smaller than a predetermined threshold value as a finger base position, and (c) measures the length from the finger base position to the position of the tip of the finger as the finger length.

9. The apparatus according to claim 4, wherein in a case where a degree of flatness threshold value for a corresponding region of the operation surface that has been stored in advance is larger than a predetermined value, the second determination unit (a) obtains the corrected position of the tip of the finger, (b) shifts the corrected position of the tip of the finger by the predetermined amount in the direction opposite to the direction of the tip of the finger, projects the shifted position onto the operation surface, and (c) determines the projected position as the touch position, and wherein in a case where the degree of flatness threshold value is not larger than the predetermined value, the second determination unit (a) shifts the position of the tip of the finger that was specified by the first specification unit by the predetermined amount in the direction opposite to the direction of the tip of the finger, (b) projects the shifted position onto the operation surface, and (c) determines the projected position as the touch position.

10. The apparatus according to claim 1, wherein the first acquisition unit includes a range sensor and acquires the three-dimensional image based on the image having distances measured by the range sensor for each pixel.

11. The apparatus according to claim 1, wherein the first acquisition unit determines a region with a predetermined color from the three-dimensional image as a hand region.

12. The apparatus according to claim 1, wherein the first specification unit calculates a curvature based on an outline of a hand region, and specifies a point at which the curvature is smaller than a predetermined value as the position of the tip of the target object.

13. The apparatus according to claim 1, wherein the first specification unit calculates a curvature of an outline of a region of the target object based on a circle or an ellipse fitted to the outline, and in a case where the curvature is smaller than a predetermined value and inside the region of the target object, the first specification unit specifies a position in the center of contour points fitted to the circle or the ellipse as the position of the tip of the target object.

14. The apparatus according to claim 1, wherein in a case where a radius of a smallest circle that encloses a finite number of adjacent contour points among contour points of an outline of a region of the target object is smaller than a predetermined value, the first specification unit specifies a point at the center of the finite number of contour points as the position of the tip of the target object.

15. The apparatus according to claim 1, wherein the first specification unit specifies a location at which a region of the target object enters the operation surface, and specifies a position of the region of the target object that is farthest from the specified location as the position of the tip of the target object.

16. The apparatus according to claim 1, wherein according to a distance from a location at which a region of the target object enters the operation surface to the position of the tip of the target object, the first specification unit specifies the touch position such that the predetermined amount increases as the distance increases.

17. The apparatus according to claim 2, wherein the second specification unit (a) specifies a location at which a region of the target object enters the operation surface based on an image obtained by projecting the three-dimensional image onto the operation surface, (b) specifies, beginning from the specified location, a position at which the width of the region of the target object becomes smaller than a predetermined threshold value, and (c) specifies a direction from the specified position to the position of the tip of the target object as a vector indicating the direction and the length of the target object.

18. The apparatus according to claim 1, wherein the target object is a hand, and wherein the second specification unit specifies, based on a region of the target object projected onto the operation surface, a region in which the width of the region of the target object becomes smaller than a predetermined value as a finger region, and specifies a direction from an end portion at which the finger was specified toward the tip of the finger as the direction of the target object.

19. The apparatus according to claim 2, wherein the second specification unit specifies, based on an image obtained by projecting the three-dimensional image onto the operation surface, a location at which a region of the target object enters the operation surface as a base of the region of the target object, and specifies a direction from the base to the tip of the target object as the direction of the target object.

20. The apparatus according to claim 1, wherein when determining the touch position, the second determination unit uses, as the predetermined amount, a distance from the tip of the target object to the center of a circle fitted to an outline of a region of the target object or a distance from the tip of the target object to, out of focal points of an ellipse fitted to the outline of the region of the target object, a point on the tip of the target object side.

21. The apparatus according to claim 1, wherein when determining the touch position, the second determination unit uses, as the predetermined amount, a distance from the position of the tip of the target object to a center of gravity of contour points enclosed by a smallest circle whose central point is a contour point specified as the position of the tip of the target object.

22. A method of specifying an operation performed on an operation surface by an apparatus, the apparatus having an image sensor installed at a position upward from the operation surface and configured to sense a distance from respective positions of a plurality of positions of a target object placed on the operation surface, the method comprising;

acquiring distances from an image sensor to respective positions of a plurality of positions of a target object placed on the operation surface;

determining that the target object performs a touch gesture against the operation surface in a case where the distance acquired by the acquiring is less than or equal to a predetermined value;

specifying a tip of the target object that is determined to have performed the touch gesture in an image having the distances acquired by the acquiring;

specifying a direction of the target object in the image having the distances;

acquiring an angle formed by the direction of the target object and the operation surface using the image having the distances; and determining, as the touch position on the operation surface, a position shifted by a predetermined amount in the specified direction of the target object from the specified tip of the target object, wherein the predetermined amount is a first amount in a case where the acquired angle is a first angle, and wherein the predetermined amount is a second amount that is smaller than the first amount in a case where the acquired angle is a second angle that is larger than the first angle.

* * * * *